(12) United States Patent
Uchida

(10) Patent No.: US 10,851,737 B2
(45) Date of Patent: Dec. 1, 2020

(54) VALVE DEVICE

(71) Applicant: DENSO CORPORATION, Kariya (JP)

(72) Inventor: Kimio Uchida, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/537,875

(22) Filed: Aug. 12, 2019

(65) Prior Publication Data

US 2020/0072165 A1    Mar. 5, 2020

(30) Foreign Application Priority Data

Aug. 28, 2018  (JP) ................................ 2018-159223

(51) Int. Cl.
*F02M 25/08*    (2006.01)

(52) U.S. Cl.
CPC . *F02M 25/0836* (2013.01); *F02M 2025/0845* (2013.01)

(58) Field of Classification Search
CPC ........ F02M 25/0836; F02M 2025/0845; F16K 27/02; F16K 31/047; F16K 31/508; B60K 15/03519; B60K 15/03504; B60K 15/035
See application file for complete search history.

(56) References Cited

U.S. PATENT DOCUMENTS

2016/0146159 A1*  5/2016  Kimoto ............. F02M 25/0836
                                                                123/520

* cited by examiner

*Primary Examiner* — Xiao En Mo
(74) *Attorney, Agent, or Firm* — Nixon & Vanderhye PC

(57) ABSTRACT

A valve device has a valve housing, a valve member, a guide member and a valve control unit. A center axis of a vapor outlet pipe is defined as a passage axis of a vapor outlet passage. A cross section of the vapor outlet pipe on a plane perpendicular to an axial direction of the vapor outlet pipe is defined as an outlet-pipe cross section. An area of the outlet-pipe cross section is defined as an outlet passage area. An overlapping area, in which the outlet-pipe cross section overlaps with an outlet-nearest wall portion, is formed when viewed them in the axial direction of the vapor outlet pipe and when the outlet-pipe cross section is projected on the outlet-nearest wall portion. The valve housing and the guide member are so formed that the overlapping area is smaller than a half of the outlet passage area.

10 Claims, 15 Drawing Sheets

VALVE OPENING DIRECTION
↕
VALVE CLOSING DIRECTION

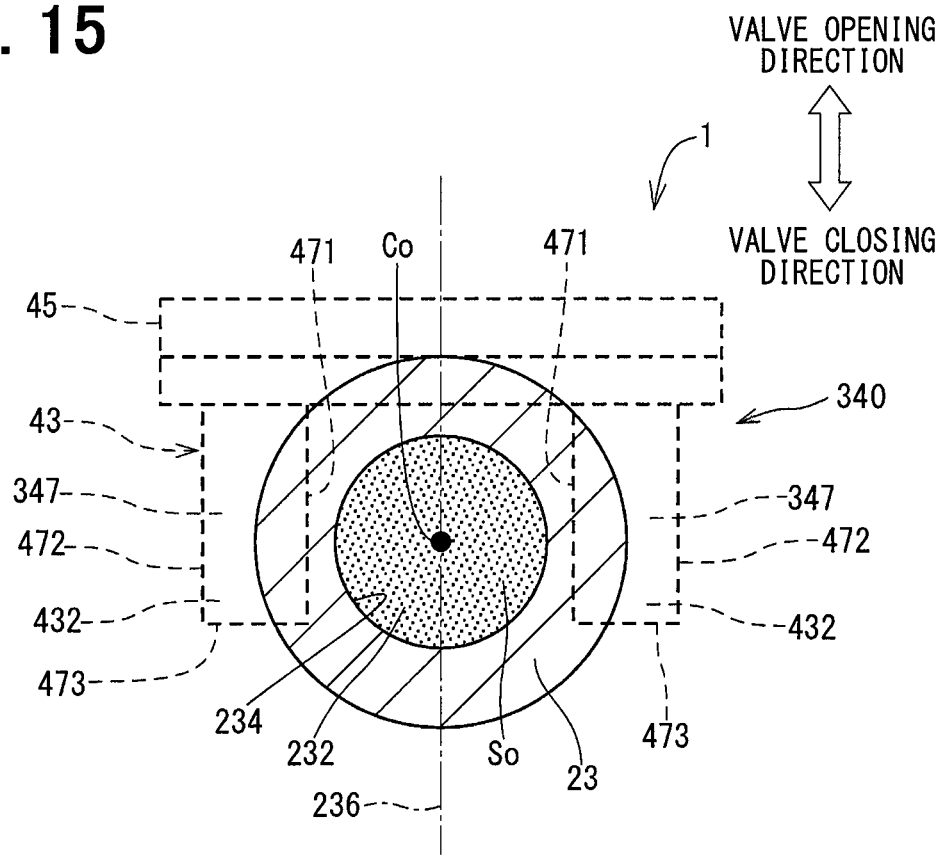
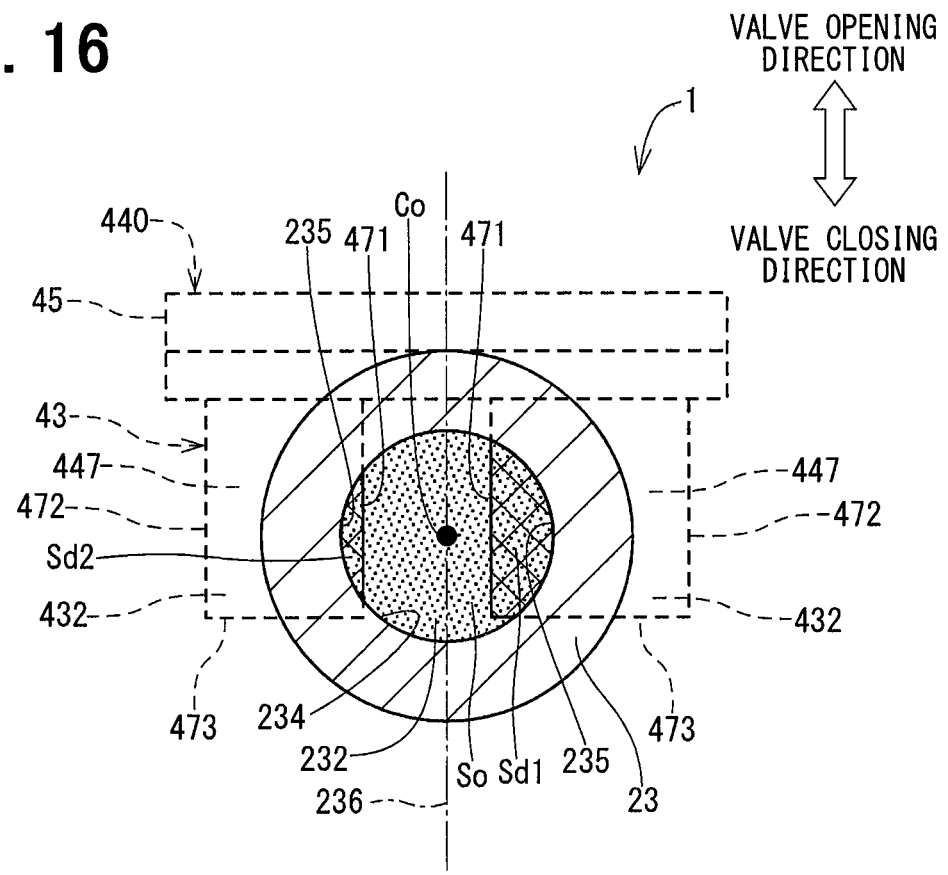

VALVE DEVICE

CROSS REFERENCE TO RELATED APPLICATION

This application is based on Japanese Patent Application No. 2018-159223 filed on Aug. 28, 2018, the disclosure of which is incorporated herein by reference.

FIELD OF TECHNOLOGY

The present disclosure relates to a valve device for a vaporized fuel processing apparatus.

BACKGROUND

A vaporized fuel processing apparatus of a prior art includes a canister for absorbing and discharging fuel vapor, which is generated in a fuel tank mounted in an automotive vehicle, and a fuel vapor passage for communicating the fuel tank to the canister. In one of prior arts, a flow-rate control valve is provided in the fuel vapor passage. The flow-rate control valve closes the fuel vapor passage during the automotive vehicle is parking, while it opens the fuel vapor passage when fuel (gasoline) is filled into the fuel tank.

In the flow-rate control valve of the above prior art, a fuel passage area may become occasionally smaller for any reason. In a case that the fuel passage area becomes smaller, an automatic stop function may be activated when the fuel vapor passage is going to be opened during a process of filling the fuel into the fuel tank. Then, it may become impossible to fill the fuel into the fuel tank.

SUMMARY OF THE DISCLOSURE

The present disclosure is made in view of the above problem. It is an object of the present disclosure to provide a valve device, according to which controllability of fluid flow is improved and electric power consumption can be reduced.

According to one of features of the present disclosure, a valve device comprises a valve housing, a valve member, a guide member and a valve control unit.

The valve member, which is movably accommodated in the valve housing, blocks off fluid flow through a valve inside passage formed in the valve housing, when the valve member is brought into a valve seat portion. On the other hand, the fluid is allowed to flow to a vapor outlet passage through the valve inside passage, when the valve member is separated from the valve seat portion.

The guide member is also movably accommodated in the valve housing so that the guide member is movable together with the valve member. The guide member has a wall portion including an outlet-nearest wall portion, which extends in a direction perpendicular to an axial direction of a vapor outlet pipe.

The housing member and the guide member are formed in such a way that an overlapping area is smaller than a half of an outlet passage area. The outlet passage area is a cross-sectional area of the vapor outlet pipe on a plane perpendicular to the axial direction of the vapor outlet pipe. The overlapping area is an area which overlaps with the outlet-nearest wall portion, when a cross section of the vapor outlet portion is projected on the outlet-nearest wall portion and when viewed them in the axial direction of the vapor outlet pipe.

BRIEF DESCRIPTION OF THE DRAWINGS

The above and other objects, features and advantages of the present disclosure will become more apparent from the following detailed description made with reference to the accompanying drawings. In the drawings:

FIG. 15 is a schematic cross-sectional view showing the valve device of a second modification and corresponding to a view taken along a line XV-XV in FIG. 14;

FIG. 16 is a schematic cross-sectional view showing the valve device of a third modification;

DETAILED DESCRIPTION OF THE EMBODIMENTS

Figure 1:
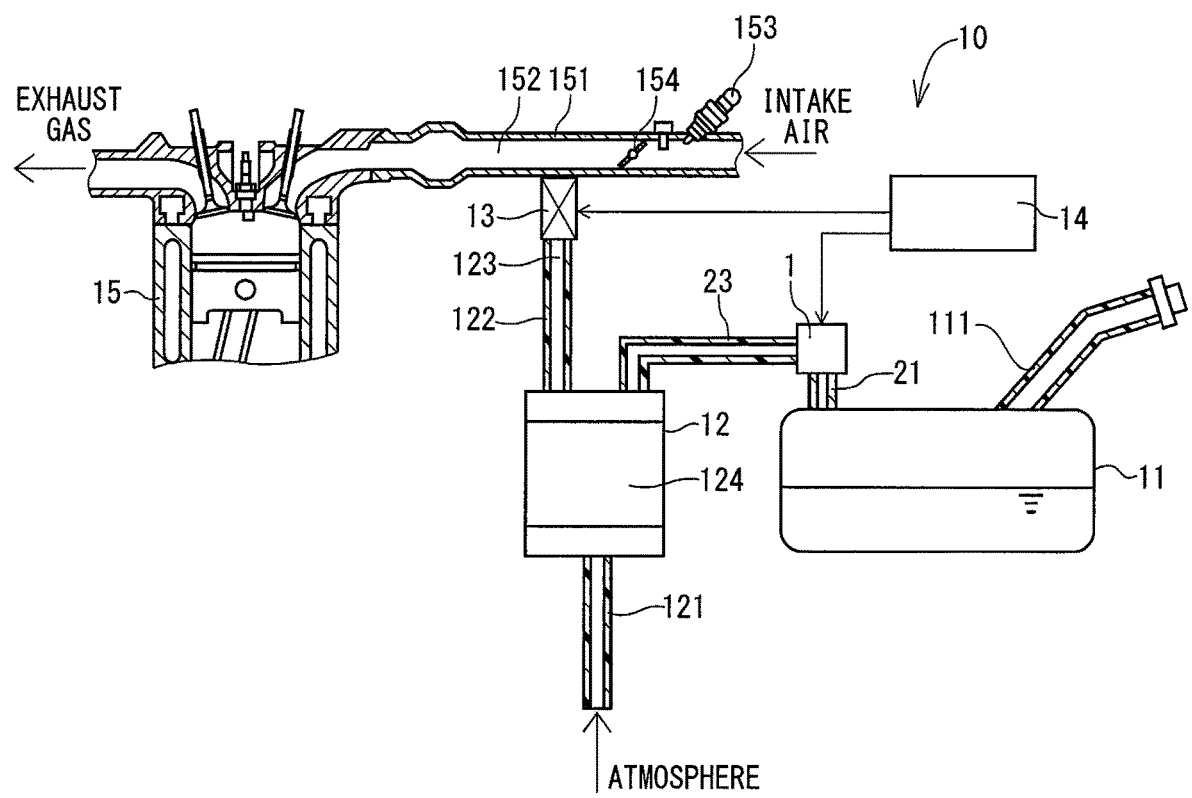
FIG. 1 is a schematic view showing an outline of a vaporized fuel processing system having a valve device according to a first embodiment of the present disclosure.

The present disclosure will be explained hereinafter by way of multiple embodiments and/or modifications with reference to the drawings. The same reference numerals are given to the same or similar structures and/or portions in order to avoid repeated explanation.

The valve device of the present disclosure controls flow rate of fluid. The valve device is applied to, for example, a vaporized fuel processing apparatus for an internal combustion engine of an automotive vehicle.

FIG. 1 is a schematic view showing an outline of a vaporized fuel processing system 10. The vaporized fuel processing system 10 is connected to an internal combustion engine 15 (hereinafter, the engine 15) and includes a fuel tank 11, a valve device 1, a canister 12, a purge valve 13, a vapor control portion 14 and so on.

The fuel tank 11 is connected to a fuel charge pipe 111 and a vapor inlet pipe 21 of the valve device 1. The fuel tank 11 stores fuel to be supplied to the engine 15. The fuel charge pipe 111 is provided in the automotive vehicle to charge the fuel into the fuel tank 11 of the automotive vehicle. The vapor inlet pipe 21 is provided to supply vaporized fuel (fuel vapor) from the fuel tank 11 to the valve device 1.

The valve device 1 opens or closes a fluid passage provided between the fuel tank 11 and the canister 12. The valve device 1 further controls flow rate of the fuel vapor flowing into the canister 12. For example, when the automotive vehicle is parked, the valve device 1 closes the fluid passage between the fuel tank 11 and the canister 12, so that the fuel vapor cannot flow from the fuel tank 11 to the canister 12. On the other hand, the valve device 1 opens the fluid passage between the fuel tank 11 and the canister 12 when the fuel is charged into the fuel tank 11 via the fuel charge pipe 111, so that the fuel vapor can flow from the fuel tank 11 to the canister 12.

The canister 12 is connected to a vapor outlet pipe 23 of the valve device 1, an atmospheric pipe 121 and a purge pipe 122. The canister 12 includes a vapor absorbing portion 124, which has absorbent material (for example, activated carbon). The vaporized fuel, which is fuel vaporized in the fuel tank 11, flows to the canister 12 via the valve device 1. The vaporized fuel is absorbed in the vapor absorbing portion 124. The atmospheric pipe 121 is provided in the canister 12 in order that outside air flows into the canister 12. The vaporized fuel from the fuel tank 11 and the air from the outside via the atmospheric pipe 121 flow to the purge valve 13 via the purge pipe 122.

The purge valve 13 is connected to the purge pipe 122 and to an intake pipe 151 of the engine 15. The purge valve 13 operatively communicates a purge passage 123 formed in the purge pipe 122 to an intake-air passage 152 formed in the intake pipe 151 or shuts off communication between the purge passage 123 and the intake-air passage 152.

The vapor control portion 14 is electrically connected to the valve device 1 and the purge valve 13. The vapor control portion 14 includes a micro-computer as a main component thereof. The micro-computer is composed of a CPU, a digital recording media, a ROM, I/O ports, a bus line connecting those parts to each other and so on. Each of processes to be carried out by the vapor control portion 14 is a software process. Alternatively, each of them or some of them may be carried out by a hardware process.

The vapor control portion 14 controls the valve device 1 in such a way that the valve device 1 opens or closes the fluid passage between the fuel tank 11 and the canister 12 depending on a running condition of the automotive vehicle. In addition, the vapor control portion 14 controls the purge valve 13 in such a way that the purge valve 13 communicates the purge passage 123 to the intake-air passage 152 or shuts off the communication between the purge passage 123 and the intake-air passage 152, depending on the running condition of the automotive vehicle. When the purge passage 123 is communicated to the intake-air passage 152, the fuel vapor absorbed in the canister 12 flows together with the air into the intake-air passage 152 at a downstream side of a fuel injection valve 153 and a throttle valve 154.

Figure 2:
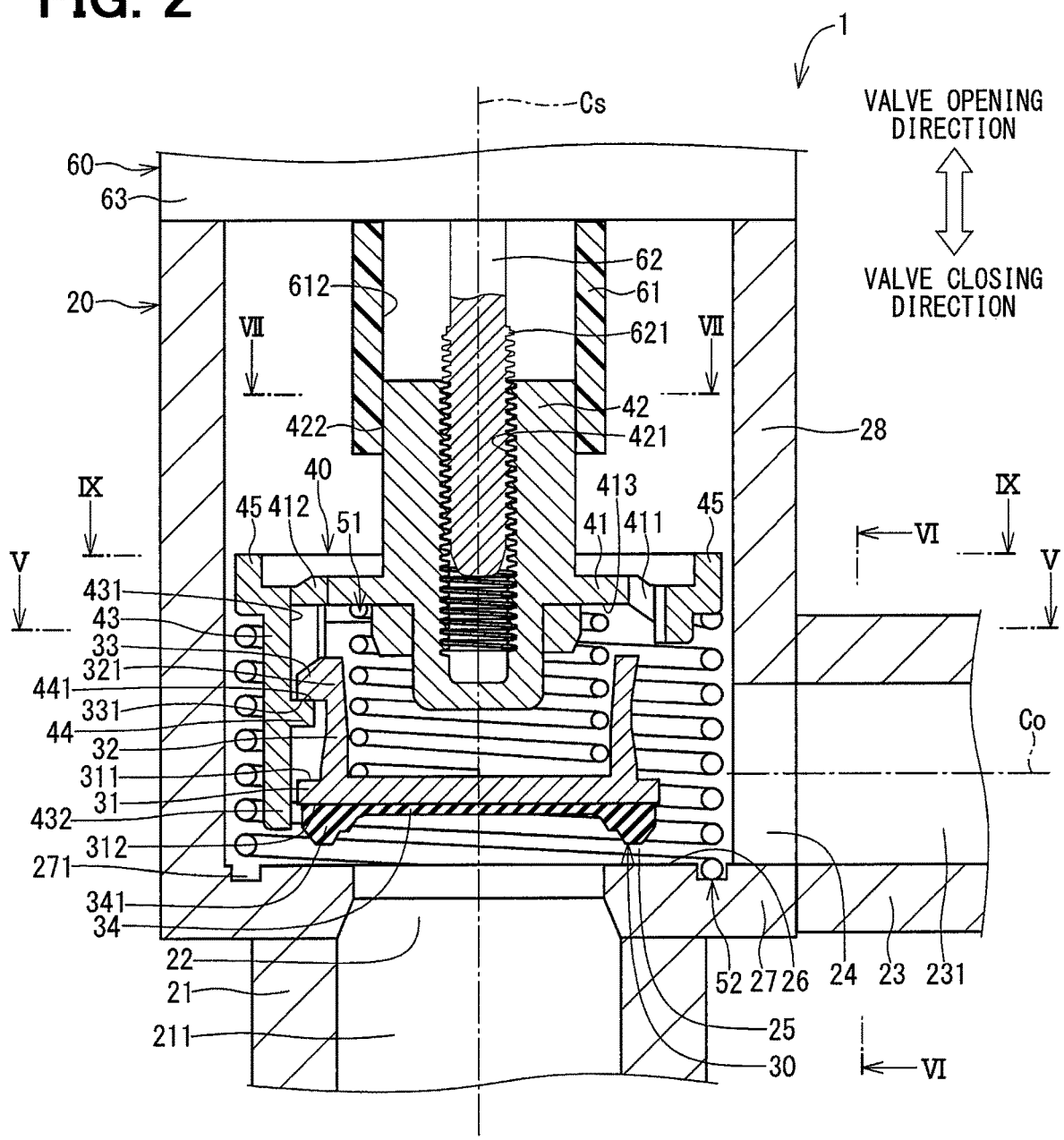
FIG. 2 is a schematic cross-sectional view showing the valve device of the first embodiment, wherein the valve device is in a valve opened condition.

As shown in FIG. 2, the valve device 1 includes a valve housing 20, a valve member 30, a guide member 40, a first spring 51, a second spring 52, a valve control unit 60 and so on.

The valve housing 20 is formed in a cylindrical shape having a closed axial end. The valve housing 20 movably accommodates the valve member 30, the first spring 51, a part of the valve control unit 60 and the second spring 52. The valve housing 20 has the vapor inlet pipe 21, a vapor inlet portion 22, the vapor outlet pipe 23, a vapor outlet portion 24, a valve inside passage 25 and a valve seat portion 26. A lower-side portion of the valve housing 20, which is located on a side to the fuel tank 11 or on a side to the vapor inlet pipe 21, is referred to as a housing bottom portion 27. A bottom groove 271 of an annular shape is formed in the housing bottom portion 27, wherein the bottom groove 271 is recessed in an axial downward direction of the valve housing 20. A housing side-wall portion 28 extends from an outer periphery of the housing bottom portion 27 in an axial upward direction of the valve housing 20.

The vapor inlet pipe 21 is provided at the housing bottom portion 27 and connected to the fuel tank 11. The vapor inlet pipe 21 is formed in a cylindrical shape. A vapor inlet passage 211 is formed in the vapor inlet pipe 21, so that the vapor inlet passage 211 has a circular cross section on a plane extending in a radial direction of the vapor inlet pipe 21 (perpendicular to an axial direction of the valve housing 20). The vapor inlet passage 211 is communicated to an inside of the fuel tank 11, so that fluid from the fuel tank 11 (that is, the fuel vapor) flows to the valve device 1 through the vapor inlet passage 211. A shape of the cross section of the vapor inlet passage 211 is not limited to the circular shape, but the cross-sectional shape of the vapor inlet passage 211 may be formed in a polygonal shape, an ellipsoidal shape, an oval shape or the like.

The vapor inlet portion 22 is formed at the housing bottom portion 27 for communicating the vapor inlet passage 211 to an inside of the valve housing 20. A part of an inner wall surface of the vapor inlet portion 22 is symmetrically inclined with respect to the axial direction of the valve housing 20, so that an inner diameter of the vapor inlet portion 22 (that is, a fluid passage area) is gradually decreased in the axial upward direction from the vapor inlet pipe 21 to the housing bottom portion 27.

The vapor outlet pipe 23 is provided at the housing side-wall portion 28 and connected to the canister 12. The vapor outlet pipe 23 extends from the housing side-wall portion 28 in a radial direction of the valve housing 20 perpendicular to the axial direction of the valve housing 20, in which the vapor inlet pipe 21 extends downwardly. The vapor outlet pipe 23 is formed in a cylindrical shape. A vapor outlet passage 231 is formed in the vapor outlet pipe 23, so that the vapor outlet passage 231 has a circular cross section on a plane extending in a radial direction of the vapor outlet pipe 23. The vapor outlet passage 231 is communicated to an inside of the canister 12, so that the fluid (the fuel vapor) from the vapor inlet passage 211 flows to the canister 12 through the vapor outlet passage 231. A center axis of the vapor outlet pipe 23 is referred to as a passage axis "Co" of the vapor outlet passage 231.

The vapor outlet portion 24 is formed in the housing side-wall portion 28 for communicating the inside of the valve housing 20 to the vapor outlet passage 231. A fluid passage area of the vapor outlet portion 24 is formed to be equal to that of the vapor outlet passage 231. In the present disclosure, the term "equal" does not mean to include only "completely equal" but includes "almost equal" having some allowable error range.

The valve inside passage 25 is a fluid passage formed in the valve housing 20 between the valve member 30 and the housing bottom portion 27. In other words, the valve inside passage 25 is the fluid passage formed between the vapor inlet portion 22 (the vapor inlet passage 211) and the vapor outlet portion 24 (the vapor outlet passage 231), so that the valve inside passage 25 is communicated to both of the valve inlet passage 211 and the valve outlet passage 231. The valve inside passage 25 is operatively closed or opened when the valve member 30 is moved in the axial direction of the valve housing 20.

The valve seat portion 26 is a part of an inner wall surface of the housing bottom portion 27. The valve seat portion 26 is opposed to the valve member 30 in the axial direction. The valve seat portion 26 extends in the radial direction of the valve housing 20 perpendicular to the axial direction of the vapor inlet pipe 21, that is, in an axial direction of the vapor outlet pipe 23. In other words, the valve seat portion 26 extends in a direction perpendicular to a moving direction of the valve member 30. The valve seat portion 26 is operatively brought into contact with the valve member 30.

The valve member 30 is movable in the valve housing 20 in the axial direction, so that the valve member 30 is brought into contact with the valve seat portion 26 or separated therefrom. The valve member 30 is formed in a cylindrical shape having a closed end. The valve member 30 includes a valve bottom portion 31, a valve side-wall portion 32, a valve-side stopper portion 33 and a seal member 34. In the present embodiment, the valve bottom portion 31, the valve side-wall portion 32 and the valve-side stopper portion 33 are integrally made of metal. However, the valve bottom portion 31, the valve side-wall portion 32 and the valve-side stopper portion 33 may be integrally made of resin.

The valve bottom portion 31 is a disc-shaped portion of the valve member 30. An outer diameter of the valve bottom portion 31 is made to be larger than that of the valve side-wall portion 32. The valve bottom portion 31 extends in a radial-outward direction of the valve member 30.

The valve side-wall portion 32 is a cylindrical portion of the valve member 30. A lower-side wall end of the valve side-wall portion 32 is connected to an upper-side surface 311 of the valve bottom portion 31. The valve side-wall portion 32 movably accommodates a part of the first spring 51. An upper-side wall end 321 of the valve side-wall portion 32 is upwardly opened in a direction opposite to the valve bottom portion 31.

The valve-side stopper portion 33 is a part of the valve member 30, which is formed in an annular shape and integrally connected to the valve side-wall portion 32. The valve-side stopper portion 33 extends in the radial-outward direction of the valve member 30 from the upper-side wall end 321 of the valve side-wall portion 32, so that the valve-side stopper portion 33 is outwardly protruded from the valve side-wall portion 32. The valve-side stopper portion 33 has a lower-side axial-end surface facing the valve seat portion 26 in the axial direction. The lower-side axial-end surface is referred to as a valve-side stopper surface 331.

The seal member 34 is connected to a lower-side surface 312 of the valve bottom portion 31. The seal member 34 is opposed to the housing bottom portion 27 in the axial direction. The seal member 34 is made of elastic material, such as, rubber, so that the seal member 34 is elastically deformable. The seal member 34 has a seal projecting portion 341 axially projecting to the valve seat portion 26.

The seal projecting portion 341 is operatively brought into contact with the valve seat portion 26 or separated from the valve seat portion 26 in accordance with the axial movement of the valve member 30. When the seal projecting portion 341 is brought into contact with the valve seat portion 26, the valve inside passage 25 is closed so that flow of the fluid through the valve inside passage 25 is blocked. On the other hand, when the seal projecting portion 341 is separated from the valve seat portion 26, the valve inside passage 25 is opened so that the fluid flows from the vapor inlet portion 22 (the vapor inlet passage 211) to the vapor outlet portion 24 (the vapor outlet passage 231).

The guide member 40 is provided at an outside of the valve member 30 for movably accommodating the valve member 30 and the first spring 51. The guide member 40 is movable in the axial direction together with the valve member 30, when the guide member 40 is brought into contact with (or engaged with) the valve member 30. The guide member 40 is so arranged in the valve housing 20 that the guide member 40 is operatively brought into contact with or separated from the valve seat portion 26. In the present disclosure, the axial upward direction is a valve opening direction, in which the valve member 30 and the guide member 40 are separated from the valve seat portion 26 in the axial direction. The axial downward direction is a valve closing direction, in which the valve member 30 or the guide member 40 is brought into contact with the valve seat portion 26.

The guide member 40 has a guide supporting portion 41, a guide-side insertion portion 42, a guide-side cylindrical portion 43 and so on. The guide member 40 guides the axial movement of the valve member 30.

The guide supporting portion 41 is a disc-shaped part of the guide member 40. An outer diameter of the guide supporting portion 41 is made to be smaller than an inner diameter of the guide-side cylindrical portion 43. The guide supporting portion 41 has a through-hole 411, which is formed at a position between the guide supporting portion 41 and the guide-side cylindrical portion 43 in a radial direction of the guide member 40. The through-hole 411 communicates a lower-side space below the guide supporting portion 41 (on a side of the valve member 30) with an upper-side space above the guide supporting portion 41 (on a side of the valve control unit 60).

The guide-side insertion portion 42 is a cylindrical part of the guide member 40, wherein the cylindrical part has a closed end and integrally formed with the guide supporting portion 41. The guide-side insertion portion 42 extends in the axial direction and penetrates the guide supporting portion 41. A lower-side end of the guide-side insertion portion 42, that is, an axial end on the side to the valve seat portion 26, is arranged at a position inside of the valve side-wall portion 32. In addition, the guide-side insertion portion 42 is inserted into a rod portion 61 of the valve control unit 60. The guide member 40 is connected to the valve control unit 60 via the guide-side insertion portion 42 and the rod portion 61 of the valve control unit 60.

A shaft portion 62 of the valve control unit 60 is inserted into an inside of the guide-side insertion portion 42. The guide-side insertion portion 42 has a guide-side screw portion 421 at its inner wall surface. The guide-side screw portion 421 is a female screw, which is engaged with a shaft-side screw portion 621 (a male screw) of the valve control unit 60.

The guide-side cylindrical portion 43 is a cylindrical part of the guide member 40, wherein the cylindrical part is connected to a radial-outer peripheral end 412 of the guide supporting portion 41. The guide-side cylindrical portion 43 movably accommodates the valve member 30 and the first spring 51. The guide-side cylindrical portion 43 extends in the axial direction (equal to a direction of the movement of the valve member 30 or the guide member 40), which is perpendicular to the axial direction of the vapor outlet pipe 23.

The guide-side cylindrical portion 43 has a guide-side stopper portion 44 and a spring holding portion 45. A guide-side inner wall surface 431 is formed at an inner wall surface of the guide-side cylindrical portion 43. A lower-side wall end 432 of the guide-side cylindrical portion 43 is opposed to the valve seat portion 26 in the axial direction.

The guide-side stopper portion 44 is arranged at an axial position, which is closer to the valve seat portion 26 than the valve-side stopper portion 33. The guide-side stopper portion 44 is projected in a radial-inward direction from the guide-side inner wall surface 431 to the valve side-wall portion 32. The guide-side stopper portion 44 has a guide-side stopper surface 441, which is operatively brought into contact with the valve-side stopper surface 331.

The guide-side stopper surface 441 is an upper-side axial-end surface of the guide-side stopper portion 44. The guide-side stopper surface 441 is axially opposed to the valve-side stopper surface 331. The guide-side stopper surface 441 is operatively brought into contact with the valve-side stopper surface 331, when the guide member 40 is moved in the valve opening direction. When the guide-side stopper surface 441 is engaged with the valve-side stopper surface 331, the valve member 30 is moved in the axial upward direction together with the guide member 40. In other words, the guide member 40 guides the axial movement of the valve member 30.

The spring holding portion 45 is a part of the guide member 40, which is formed at an upper-side wall end of the guide-side cylindrical portion 43. Therefore, the spring holding portion 45 is located at a position opposite to the lower-side wall end 432 in the axial direction. The spring holding portion 45 is formed in an annular shape, an outer diameter of which is larger than that of the other part of the guide-side cylindrical portion 43. The spring holding portion 45 extends in the axial upward direction of the guide member 40. The spring holding portion 45 supports the second spring 52.

The first spring 51 is arranged in a radial-inside space of the valve member 30. One axial end of the first spring 51 (a lower-side end) is in contact with the upper-side surface 311 of the valve bottom portion 31, while the other axial end of the first spring 51 (an upper-side end) is in contact with a lower-side surface 413 of the guide supporting portion 41. The first spring 51 biases the valve member 30 in the valve closing direction (in the axial downward direction).

The second spring 52 is arranged in a radial-outside space of the guide member 40. One axial end of the second spring 52 (an upper-side end) is in contact with the spring holding portion 45 of the guide member 40, while the other axial end of the second spring 52 (a lower-side end) is in contact with the housing bottom portion 27. More exactly, the lower-side end of the second spring 52 is accommodated in the bottom groove 271 formed in the housing bottom portion 27. The second spring 52 biases the guide member 40 in the valve opening direction (in the axial upward direction). The second spring 52 absorbs a backlash between the guide-side screw portion 421 and the shaft-side screw portion 621.

The valve control unit 60 is provided at an upper-side position of the valve housing 20, which is an opposite side to the valve seat portion 26 in the axial direction. The valve control unit 60 includes the rod portion 61, the shaft portion 62, an electric motor 63 and so on. The valve control unit 60 controls the axial movement of the guide member 40. The valve control unit 60 further controls the axial movement of the valve member 30 by controlling the movement of the guide member 40. The valve control unit 60 finally controls flow rate of the fluid flowing through the valve inside passage 25 by controlling the axial movement of the valve member 30.

The rod portion 61 is formed in a cylindrical shape for movably accommodating the shaft portion 62. The guide-side insertion portion 42 is movably inserted into the rod portion 61, so that the guide member 40 is movably connected to the valve control unit 60. The rod portion 61 and the guide-side insertion portion 42 may be so modified that the rod portion 61 is movably inserted into the guide-side insertion portion 42.

The guide-side insertion portion 42 has an outer peripheral surface 422. The rod portion 61 has an inner wall surface 612. A shape of the rod portion 61, more exactly, a cross-sectional shape of the inner wall surface 612 is so made to be similar to that of the outer peripheral surface 422, so that the guide-side insertion portion 42 is movable with respect to the rod portion 61 in the axial direction in such a way that the outer peripheral surface 422 axially moves along the inner wall surface 612.

The shaft portion 62 is movably inserted into the guide-side insertion portion 42. The shaft portion 62 is composed of a ball screw, so that the shaft portion 62 is rotated around a center axis "Cs" with respect to the guide-side screw portion 421. The shaft portion 62 is arranged in such a way that the center axis "Cs" thereof coincides with each of center axes of the valve member 30 and the guide member 40. The shaft portion 62 includes the shaft-side screw portion 621 at its outer peripheral surface. The shaft-side screw portion 621 is made of the male screw, so that it is screw-engaged with the guide-side screw portion 421.

The electric motor 63 has a motor casing and is connected to the shaft portion 62, so that the shaft portion 62 is rotated by the electric motor 63. For example, the electric motor 63 is composed of a stepping motor for outputting torque to the shaft portion 62 in accordance with a command signal from the vapor control portion 14. When the shaft portion 62 is rotated by the electric motor 63, rotational energy of the shaft portion 62 is converted into a linear movement energy of the guide member 40.

The backlash between the guide-side screw portion 421 and the shaft-side screw portion 621 is removed by the second spring 52.

When the guide member 40 is moved in the valve opening direction (in the upward direction), the guide-side stopper portion 44 is brought into contact with the valve-side stopper portion 33 and thereby the valve member 30 is moved in the valve opening direction together with the guide member 40. The valve inside passage 25 is opened and communicates the vapor inlet portion 22 and the vapor inlet passage 211 to the vapor outlet portion 24 and the vapor outlet passage 231. As a result, the fluid (the fuel vapor) from the fuel tank 11 flows to the canister 12 through the vapor inlet passage 211, the vapor inlet portion 22, the valve inside passage 25, the vapor outlet portion 24 and the vapor outlet passage 231.

Figure 3:
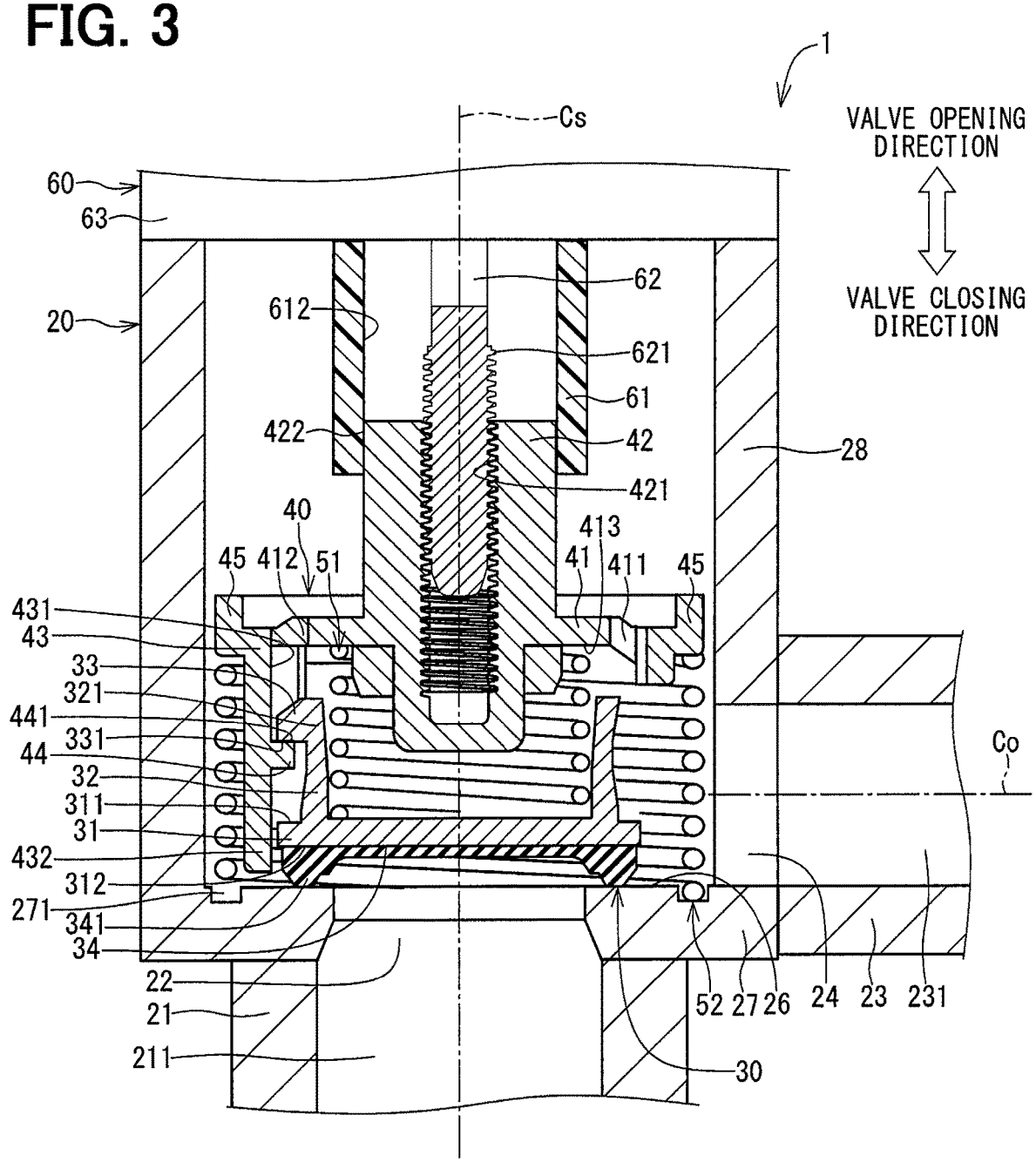
FIG. 3 is a schematic cross-sectional view showing the valve device of the first embodiment, wherein the valve device is in a valve closed condition.

As shown in FIG. 3, when the guide member 40 is moved in the valve closing direction (in the downward direction), the valve member 30 is moved in the valve closing direction together with the guide member 40 and thereby the seal projecting portion 341 of the seal member 34 is brought into contact with the valve seat portion 26. When the seal projecting portion 341 is brought into contact with the valve seat portion 26, the valve inside passage 25 is closed so that the fluid flow through the valve inside passage 25 is blocked. The seal projecting portion 341 is elastically deformed by the biasing force of the first spring 51 to fluid-tightly close the valve inside passage 25.

Figure 4:
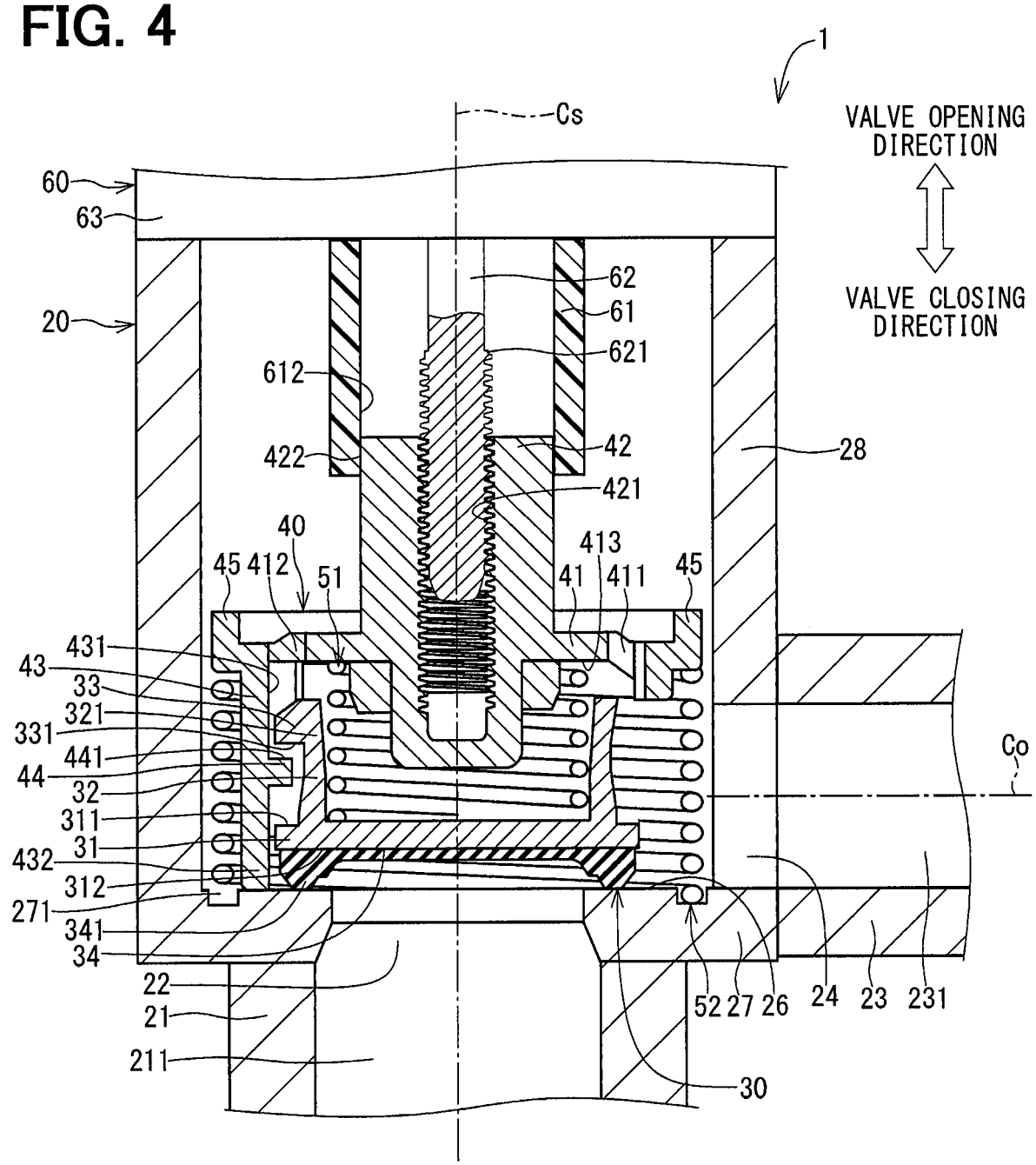
FIG. 4 is a schematic cross-sectional view showing the valve device of the first embodiment, wherein the valve device is in the valve closed condition and an axial movement of a valve member as well as an axial movement of a guide member is stopped.

As shown in FIG. 4, when the guide member 40 is further moved in the valve closing direction (in the downward direction), the guide-side stopper portion 44 is separated from the valve-side stopper portion 33 in the axial direction. Then, the guide member 40 is separated from the valve member 30 in the axial direction and the lower-side wall end 432 of the guide-side cylindrical portion 43 is brought into contact with the valve seat portion 26. When the lower-side wall end 432 is brought into contact with the valve seat portion 26, the valve control unit 60 determines that the fluid passage in the valve housing 20 is closed and the rotation of the shaft portion 62 by the electric motor 63 is stopped. As above, it is possible to avoid a situation that an excessive force may be applied to the seal projecting portion 341. As above, the flow rate of the fluid from the fuel tank 11 to the canister 12 can be controlled by the valve device 1.

When the fluid passage in the valve housing 20 is opened, any portion of the guide-side cylindrical portion 43 may become an obstacle to flow of the fluid and thereby a fluid-flow resistance may be increased. When the fluid-flow resistance is increased, controllability for the fluid flow rate becomes worse. In the vaporized fuel processing apparatus, when the controllability for the fluid flow rate is decreased, the fluid passage in the valve device may not be quickly or smoothly opened in a fuel filling process for the fuel tank. Then, an auto-stop function is operated in the fuel filling process and it may become impossible to fill the fuel into the fuel tank 11. There may be another problem that a part of the fuel runs over in the fuel filling process. In the present disclosure, the valve device 1 can increase the controllability for the fluid flow rate, as explained below.

Figure 5:
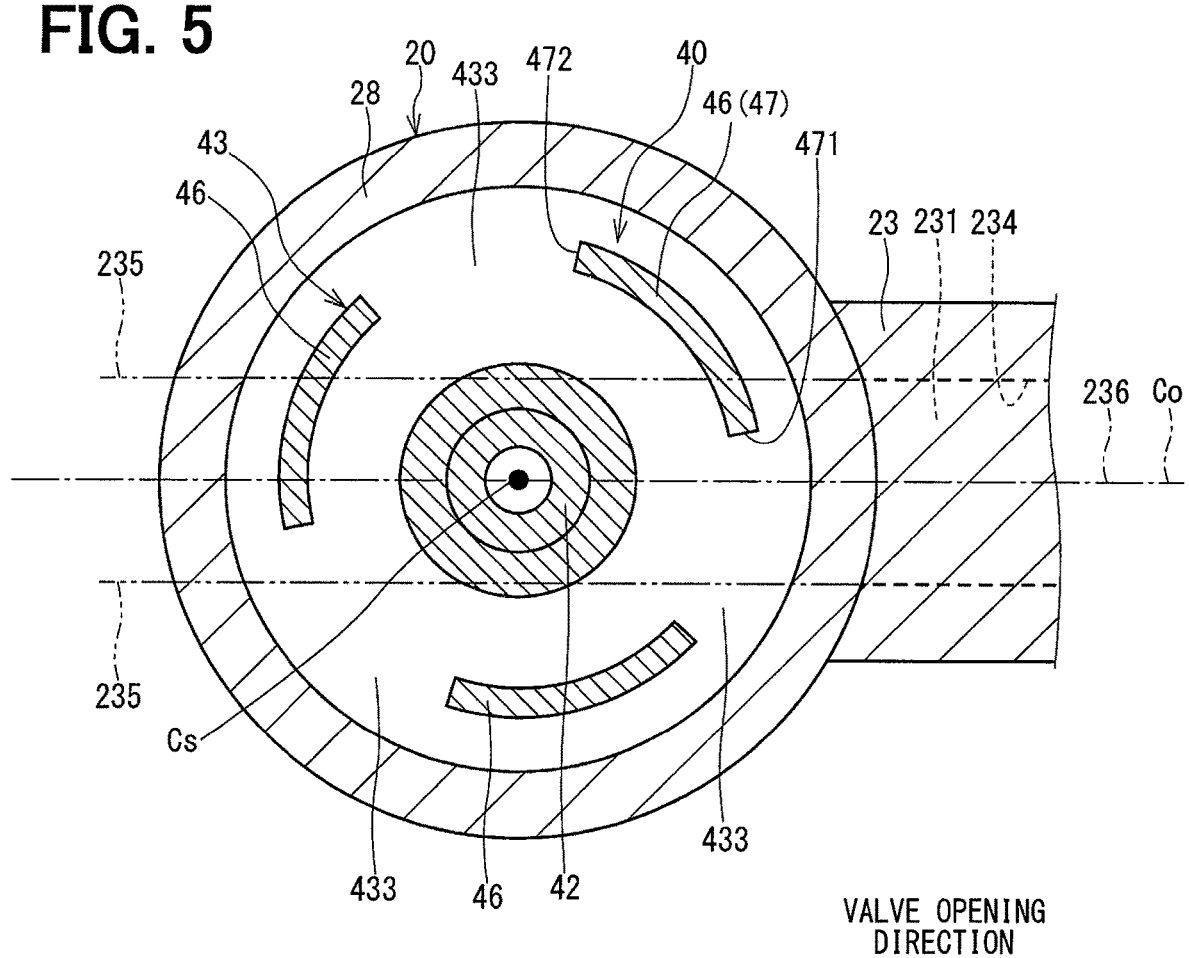
FIG. 5 is a schematic cross-sectional view showing the valve device taken along a line V-V in FIG. 2.
Figure 6:
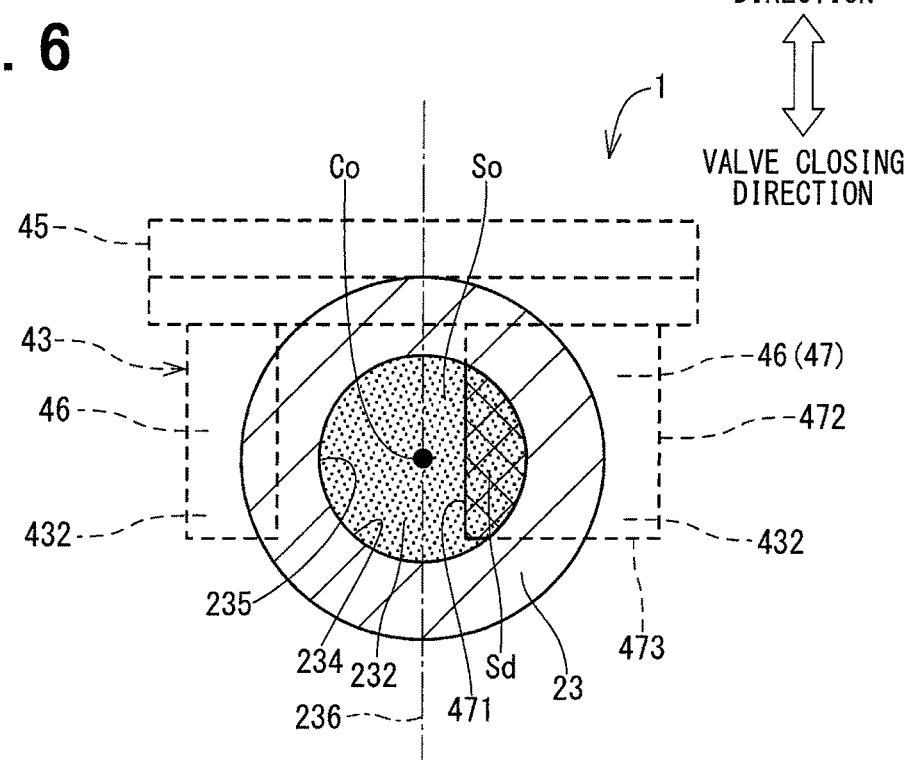
FIG. 6 is a schematic cross-sectional view showing the valve device taken along a line VI-VI in FIG. 2.

As shown in FIGS. 5 and 6, the guide-side cylindrical portion 43 has multiple cut-out portions 433 and multiple wall portions 46. In the present embodiment, the guide-side cylindrical portion 43 has three cut-out portions 433 and three wall portions 46. Each of the wall portions 46 is provided at a position between neighboring cut-out portions 433 in a circumferential direction of the guide-side cylindrical portion 43. The wall portions 46 are arranged at equal intervals in the circumferential direction. One of the wall portions 46, which is located at a circumferential position closest to the vapor outlet pipe 23 (the vapor outlet passage 231), is referred to as an outlet-nearest wall portion 47.

In FIG. 5, illustrations for the valve member 30, the first spring 51 and the second spring 52 are omitted in order to clearly and simply show relationship between the guide member 40 and the vapor outlet pipe 23. FIG. 6 is a schematic cross-sectional view taken along a line VI-VI in FIG. 2 for showing a cross section of the vapor outlet pipe 23, when viewed it from a right-hand side in a direction along the passage axis "Co" of the vapor outlet pipe 23. In a similar manner, in FIG. 6, illustrations for the valve member 30, the first spring 51 and the second spring 52 are omitted in order to clearly and simply show the relationship between the guide member 40 and the vapor outlet pipe 23. In FIG. 6, the spring holding portion 45 of the guide member 40, the wall portion 46 and the outlet-nearest wall portion 47 are indicated by dotted lines.

The vapor outlet pipe 23 has an outlet-passage cross section 232 of the vapor outlet passage 231, which is a cross section on a plane perpendicular to the passage axis "Co" of the vapor outlet pipe 23. The outlet-passage cross section 232 has an outlet passage area "So". In FIG. 6, which shows the vapor outlet pipe 23 when viewing it from the right-hand side in the direction of the passage axis "Co" of the vapor outlet pipe 23, an overlapping area "Sd" is indicated by crossing hatched lines in a shaded area. The overlapping area "Sd" is a portion, in which a part of the outlet-passage cross section 232 and a part of the outlet-nearest wall portion 47 overlap with each other, when the outlet-passage cross section 232 is projected on the outlet-nearest wall portion 47. In FIG. 6, the outlet passage area "So" is indicated by the shaded area with dots.

The valve housing 20 and the guide member 40, more exactly, the overlapping area "Sd" and the outlet passage area "So", satisfy a relationship of the following formula 1:

$$\text{``Sd''} \leq 0.5 \times \text{``So''} \tag{formula 1}$$

As shown in FIG. 5, one of circumferential ends of the outlet-nearest wall portion 47 extends in the circumferential direction of the guide member 40, that is, in a direction perpendicular to the passage axis "Co" of the vapor outlet pipe 23. In the present embodiment, the outlet-nearest wall portion 47 extends in the axial direction of the guide member 40, in which the guide member 40 and the valve member 30 is operatively moved. The outlet-nearest wall portion 47 has a first wall side end 471, a second wall side end 472 and a bottom-side wall surface 473 (a lower-side surface of the outlet-nearest wall portion 47).

The bottom-side wall surface 473 is the lower-side surface of the outlet-nearest wall portion 47, which is opposed to the valve seat portion 26 in the axial direction. The first wall side end 471 extending from the bottom-side wall surface 473 is located at a first circumferential position closer to the vapor outlet pipe 23 in the circumferential direction. The second wall side end 472 extending from the bottom-side wall surface 473 is located at a second circumferential position, which is an opposite side to the first circumferential position and away from the vapor outlet pipe 23 in the circumferential direction. Each of the first and the second wall side ends 471 and 472 may be inclined with respect to the axial direction of the guide member 40. The bottom-side wall surface 473 may be inclined with respect to the surface of the valve seat portion 26.

In FIG. 5, a virtual inner peripheral surface 235 is indicated by two-dot-chain lines, which is a virtual surface extending from an outlet-pipe inner peripheral surface 234 of the vapor outlet pipe 23. In FIGS. 5 and 6, a virtual center surface 236 is indicated by a one-dot-chain line, which is a virtual surface passing through the passage axis "Co" of the vapor outlet passage 231 and extending in the axial direction of the valve housing 20, in which the valve member 30 and the guide member 40 move.

The valve housing 20 and the guide member 40 are arranged in such a way that at least a part of the first wall side end 471 is located at a position between the virtual inner peripheral surface 235 and the virtual center surface 236 in the circumferential direction of the guide member 40. In addition, the valve housing 20 and the guide member 40 are so arranged that the first wall side end 471 does not cross over the virtual center surface 236 in the circumferential direction of the guide member 40. Furthermore, the valve housing 20 and the guide member 40 are arranged in such a way that the second wall side end 472 is located at a position outside of the virtual inner peripheral surface 235 in the circumferential direction of the guide member 40, that is, in the radial direction of the vapor outlet pipe 23.

The guide-side insertion portion 42 of the guide member 40 may be rotated with respect to the rod portion 61 by pressure of the fluid, by vibration generated in the valve device 1, by vibration transmitted from an outside of the valve device 1 and so on. Then, the guide member 40 may be moved in the axial direction. In such a case, the guide member 40 may be moved to such a position, at which the guide-side cylindrical portion 43 may close the vapor outlet passage 231. In such a case, a fluid passage area becomes smaller and the fluid flow resistance may be increased. As explained above, when the fluid flow resistance becomes larger, the controllability for the fluid flow becomes worse. In view of this point, in the valve device 1 of the present embodiment, a first rotation limiting portion 81 and a second rotation limiting portion 82 are provided to prevent or to limit a relative rotation of the guide member 40 to the valve housing 20, as explained below.

Figure 7:
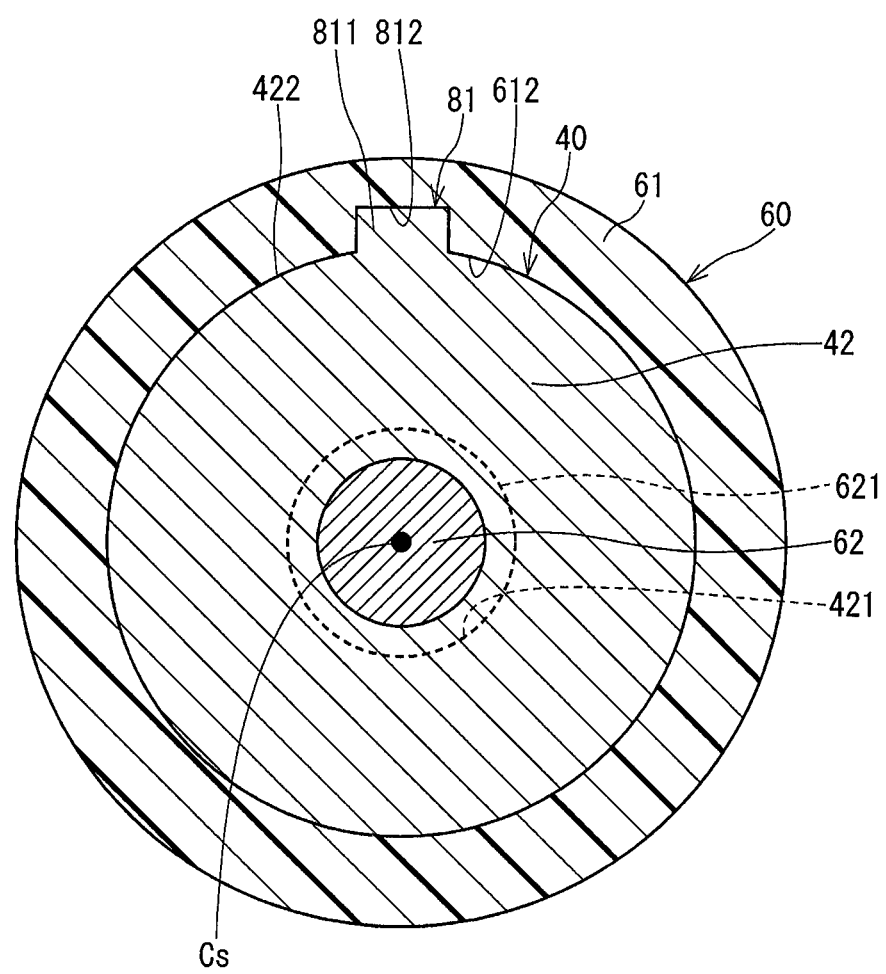
FIG. 7 is a schematic cross-sectional view showing the valve device taken along a line VII-VII in FIG. 2.
Figure 8:
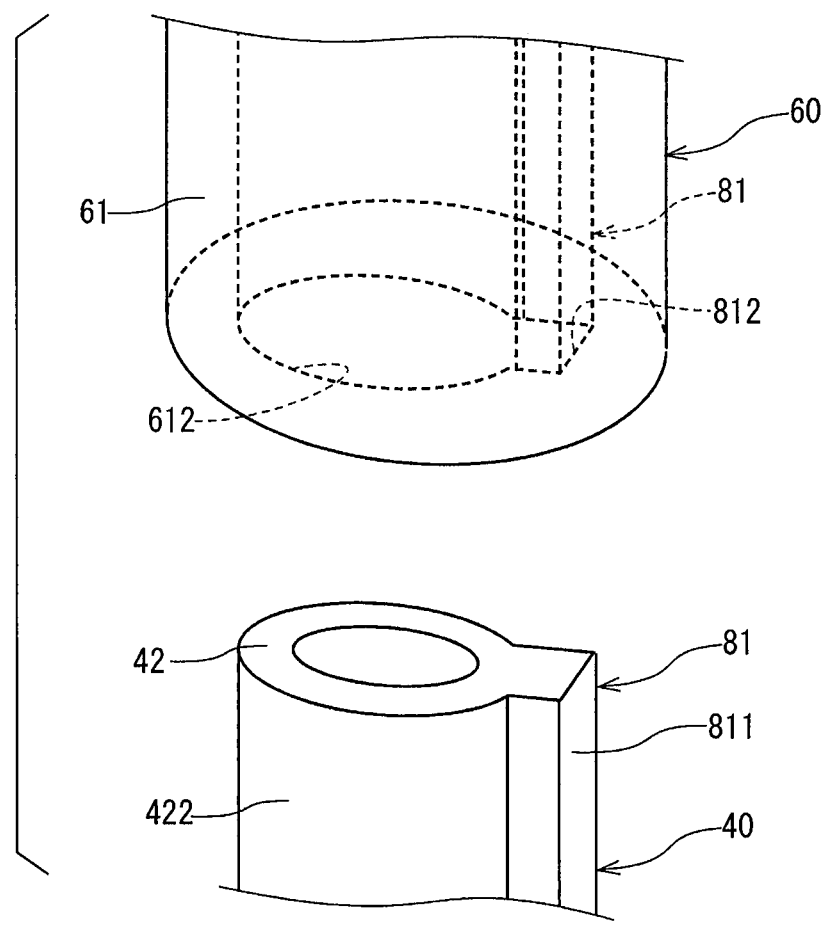
FIG. 8 is a schematic perspective view showing a part of the guide member as well as a part of a rod portion of the first embodiment.

As shown in FIGS. 7 and 8, the first rotation limiting portion 81 is formed in the guide-side insertion portion 42 and the rod portion 61. The first rotation limiting portion 81 includes a guide-side projecting portion 811 and a rod-side groove portion 812. In FIG. 7, the guide-side insertion portion 42 and the rod portion 61 are shown in an enlarged manner to more clearly show the relationship between them.

The guide-side projecting portion 811 is formed at the outer peripheral surface 422 of the guide-side insertion portion 42 and projects in the radial-outward direction of the guide member 40. The guide-side projecting portion 811 has a cross section of a polygonal shape on a plane perpendicular to the axial direction of the guide member 40.

The rod-side groove portion 812 is formed at the inner wall surface 612 of the rod portion 61 and recessed in the radial-outward direction of the guide member 40. The rod-side groove portion 812 has a cross-sectional shape corresponding to that of the guide-side projecting portion 811. In the present embodiment, the rod-side groove portion 812 has the cross section of a rectangular shape. When the guide-side projecting portion 811 is inserted into and engaged with the rod-side groove portion 812, the relative rotation of the guide member 40 is restricted with respect to the rod portion 61.

Figure 9:
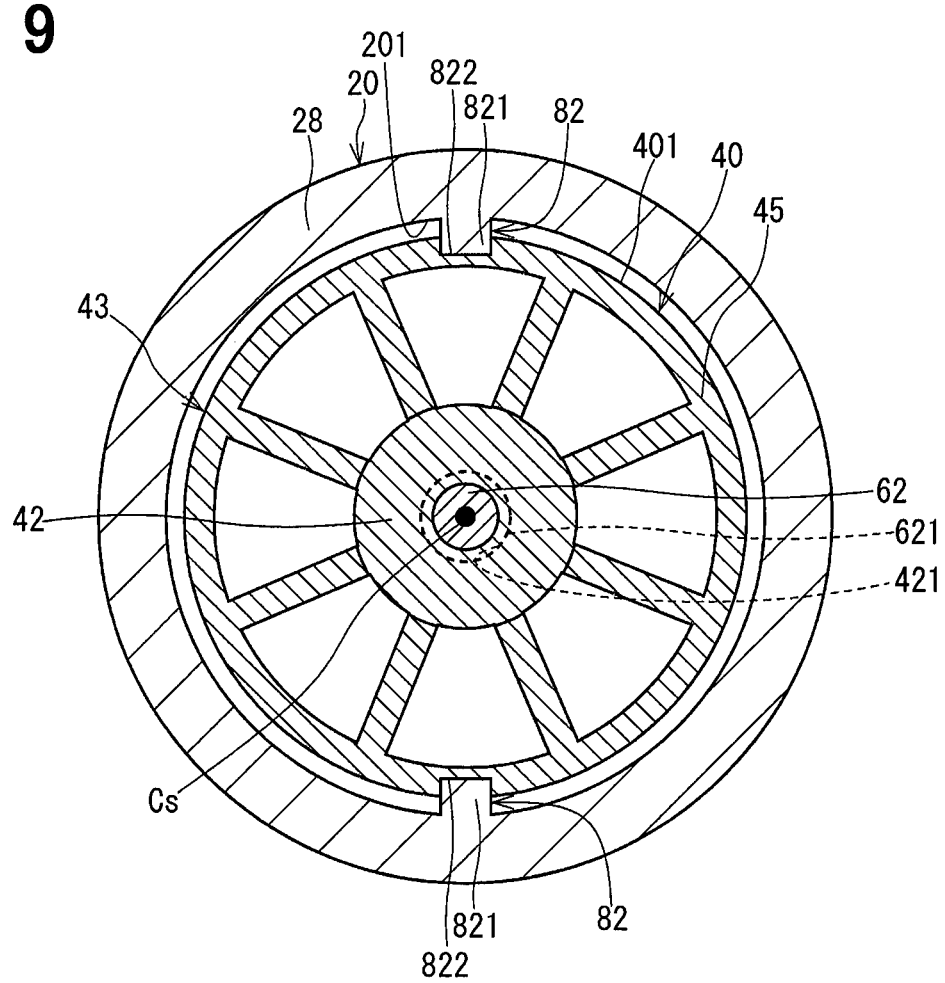
FIG. 9 is a schematic cross-sectional view showing the valve device taken along a line IX-IX in FIG. 2.
Figure 10:
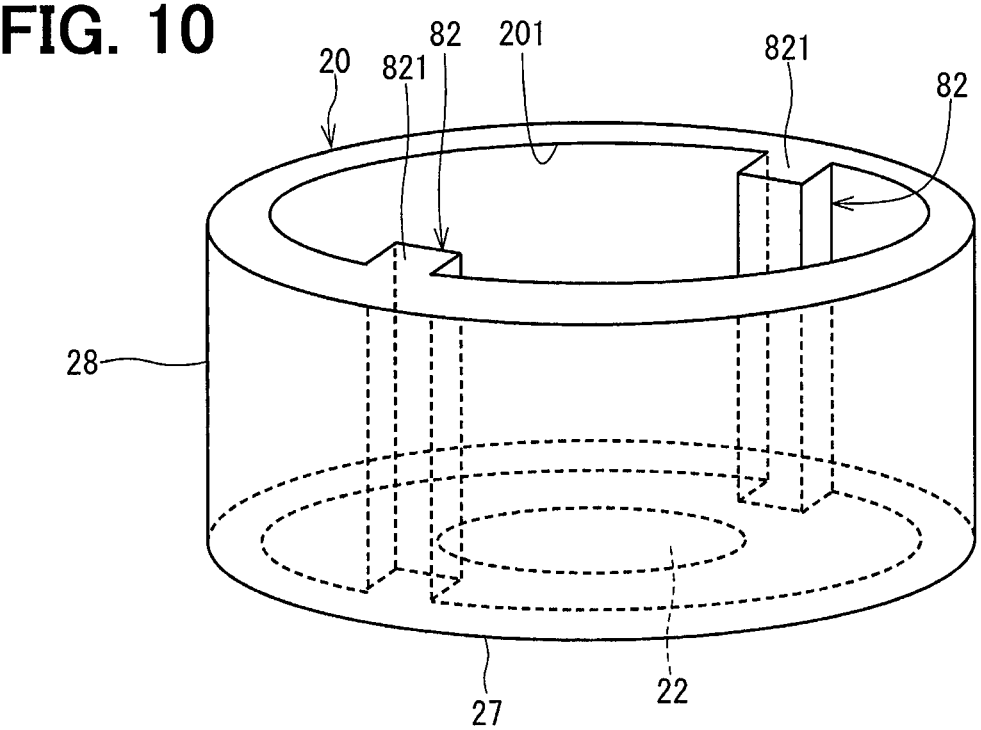
FIG. 10 is a schematic perspective view showing a housing side-wall portion of the valve device of the first embodiment.
Figure 11:
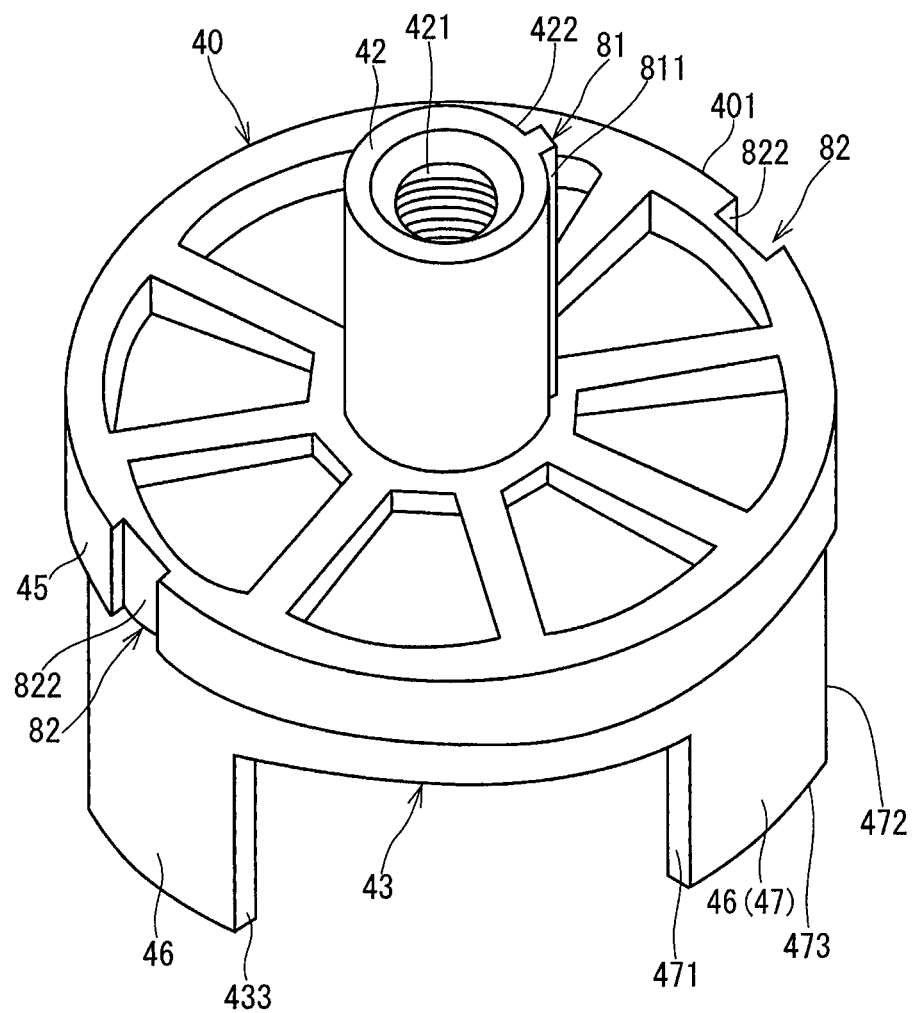
FIG. 11 is a schematic perspective view showing the guide member of the valve device of the first embodiment.

As shown in FIGS. 9 to 11, the second rotation limiting portion 82 is formed in the valve housing 20 and the guide member 40. The second rotation limiting portion 82 includes multiple housing-side projecting portion 821 and multiple guide-side groove portions 822. The valve housing 20 has an inner wall surface 201 extending from the valve seat portion 26 in the axial direction. The spring holding portion 45 of the guide member 40 has an outer wall surface 401 at an outer periphery of the spring holding portion 45, which is opposed to the inner wall surface 201 of the valve housing 20 in the radial direction. In FIG. 10, the vapor inlet pipe 21 and the vapor outlet pipe 23 are omitted to clearly show the housing-side projecting portions 821.

Each of the housing-side projecting portions 821 is projected from the inner wall surface 201 in the radial-inward direction of the valve housing 20. Each of the housing-side projecting portions 821 has a cross section of a polygonal shape on a plane perpendicular to the axial direction of the valve housing 20. In the present embodiment, the housing-side projecting portions 821 are integrally formed with the valve housing 20. Alternatively, the housing-side projecting portions 821 may be separately formed from the valve housing 20.

Each of the guide-side groove portions 822 is formed at the outer wall surface 401 and recessed in the radial-inward direction of the guide member 40. Each of the guide-side groove portions 822 has a cross-sectional shape corresponding to that of the housing-side projecting portion 821. In the present embodiment, the guide-side groove portion 822 has the cross section of a rectangular shape. When the housing-side projecting portions 821 are respectively inserted into and engaged with the guide-side groove portion 822, the relative rotation of the guide member 40 is restricted with respect to the valve housing 20.

The valve device 1 of the present embodiment has the following advantages:

(A1) In the present embodiment, the valve housing 20 and the guide member 40 are so formed that the overlapping area "Sd" is equal to or smaller than the half of the outlet passage area "So" (Sd≤0.5× So). According to such a structure, the outlet-nearest wall portion 47 of the guide member 40 does not become obstacles to the fluid flow in the valve inside passage 25, to thereby avoid a situation that the fluid flow resistance is increased. As a result, the controllability of the fluid flow rate can be increased.

(A2) In the present embodiment, the valve housing 20 and the guide member 40 are so formed that at least the part of the first wall side end 471 of the outlet-nearest wall portion 47 is located at the position between the virtual inner peripheral surface 235 and the virtual center surface 236 in the circumferential direction of the guide member 40 and in the radial direction of the vapor outlet pipe 23. In addition, the valve housing 20 and the guide member 40 are so formed that the second wall side end 472 of the outlet-nearest wall portion 47 is located at the position outside of the virtual inner peripheral surface 235 in the circumferential direction of the guide member 40 and in the radial direction of the vapor outlet pipe 23. According to the above structure, it is possible to easily satisfy the relationship of the formula 1 ("Sd"≤0.5× "So"). Accordingly, it is possible to avoid the situation that the fluid flow resistance is increased. The controllability of the fluid flow rate can be thereby improved.

(A3) In the present embodiment, the first and the second rotation limiting portions 81 and 82 can restrict the relative rotation of the guide member 40 to the valve housing 20 in the circumferential direction of the guide member 40. According to the above structure, it is possible to avoid the situation that the guide member 40 is moved to such a position at which the guide member 40 may restrict or close the fluid flow in the valve inside passage 25. As a result, it becomes possible to avoid the situation that the fluid flow resistance is increased. The controllability of the fluid flow rate can be further improved.

(A4) In the present embodiment, the first rotation limiting portion 81 includes the guide-side projecting portion 811 and the rod-side groove portion 812, while the second rotation limiting portion 82 includes the housing-side projecting portions 821 and the guide-side groove portions 822. According to the above structure, it becomes easier to position the guide-side insertion portion 42 to the rod portion 61. Since a positioning process between the valve housing 20 and the guide member 40 becomes easier, it becomes easier to satisfy the relationship of the formula 1 ("Sd"≤0.5× "So") when assembling the valve device 1. In a similar manner to the above second advantage (A2), it is possible to avoid the situation that the fluid flow resistance is increased and thereby the controllability of the fluid flow rate can be improved.

(A5) In the present embodiment, the guide-side cylindrical portion 43 of the guide member 40 has the multiple cut-out portions 433. According to the above structure, weight of the guide member 40 becomes smaller. In addition, when the weight of the guide member 40 becomes smaller, inertia moment of the guide member 40 becomes smaller and the guide member 40 may easily rotate or move. As a result, the controllability for the fluid flow rate through the valve inside passage 25 can be further improved.

Second Embodiment

A valve device 2 of a second embodiment is different from the valve device 1 of the first embodiment in shapes of the guide member 40 and the valve housing 20.

Figure 12:
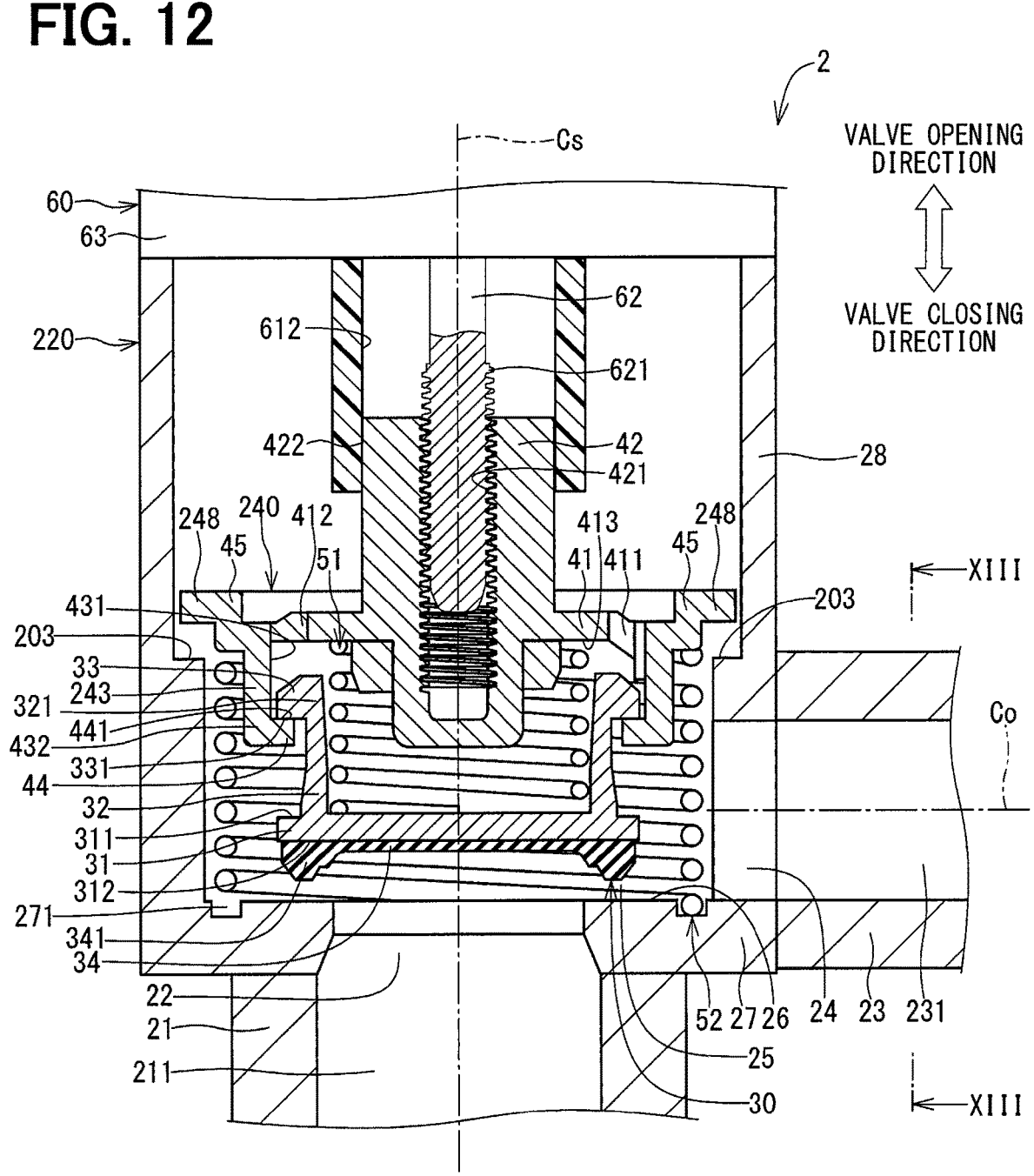
FIG. 12 is a schematic cross-sectional view showing a valve device according to a second embodiment of the present disclosure.
Figure 13:
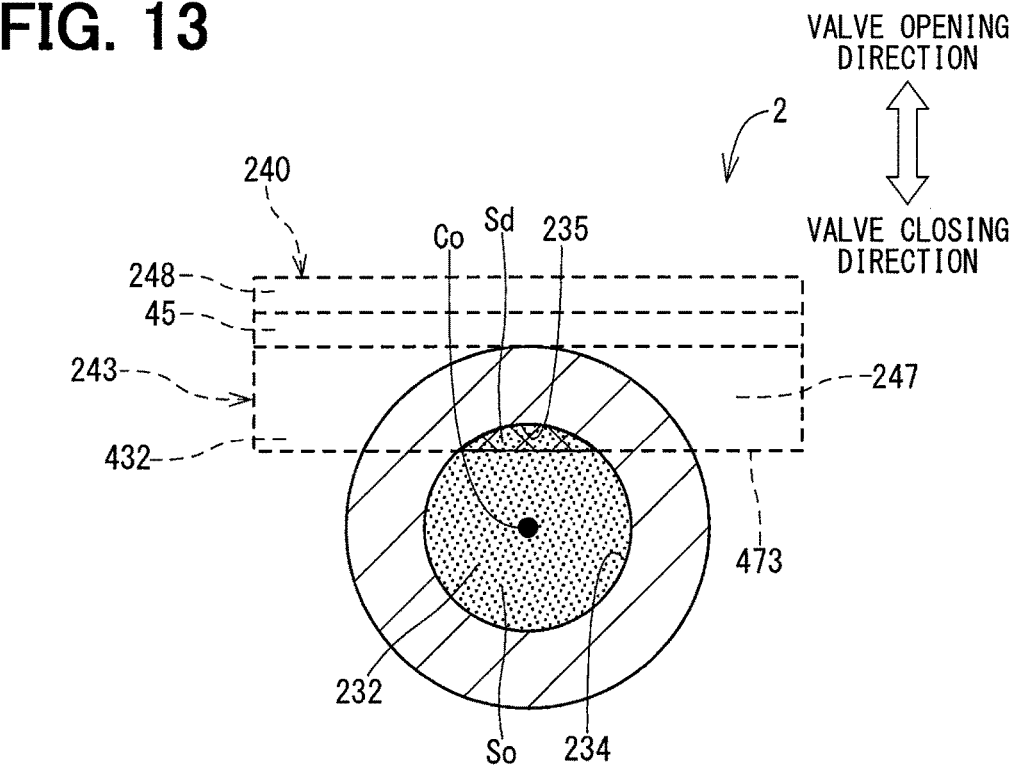
FIG. 13 is a schematic cross-sectional view showing the valve device taken along a line XIII-XIII in FIG. 12.

As shown in FIGS. 12 and 13, in the valve device 2 of the second embodiment, cut-out portions (corresponding to the cutout portions 433 of the first embodiment) are not formed in a guide-side cylindrical portion 243 of a guide member 240. The guide-side cylindrical portion 243 is formed in a cylindrical shape, so that the guide-side cylindrical portion 243 has an annular cross-sectional shape on a plane perpendicular to the axial direction of the guide member 240. In the present embodiment, the guide-side stopper portion 44 (hereinafter, the first guide-side stopper portion 44) extends from the lower-side wall end 432 of the guide-side cylindrical portion 243 in the radial-inward direction of the guide member 240.

The guide member 240 has a second guide-side stopper portion 248, which is projected from the spring holding portion 45 in the radial-outward direction of the guide member 240.

A valve housing 220 has a stepped-portion surface 203, which faces the second guide-side stopper portion 248 in the axial direction of the valve housing 220. The second guide-side stopper portion 248 is operatively brought into contact with the stepped-portion surface 203.

When the valve member 30 and the guide member 240 are moved in the valve closing direction (in the downward direction), the valve inside passage 25 is closed. When the valve member 30 and the guide member 240 are further moved in the valve closing direction, the second guide-side stopper portion 248 is brought into contact with the stepped-portion surface 203. Then, the valve control unit 60 determines that the valve inside passage 25 in the valve housing 220 is closed and the rotation of the shaft portion 62 by the electric motor 63 is stopped. As a result, it is possible to avoid the situation that the excessive force may be applied to the seal projecting portion 341.

In the same manner to the first embodiment, the valve housing 220 and the guide member 240 are so formed that the relationship of the formula 1 is satisfied, namely the overlapping area "Sd" is smaller than the half of the outlet passage area "So". In the present embodiment, a part of the guide-side cylindrical portion 243 on a side closer to the vapor outlet pipe 23 is defined as an outlet-nearest wall portion 247.

The valve housing 220 and the guide member 240 are so formed that a bottom-side wall surface 473 (the lower-side surface of the guide-side cylindrical portion 243) is located at an axial position on a side of the passage axis "Co" opposite to the valve seat portion 26, namely, at a position in the axial direction of the guide member 240 between the passage axis "Co" and the virtual inner peripheral surface 235 of the upper side. In other words, the valve housing 220 and the guide member 240 are so formed that the bottom-side wall surface 473 (the lower-side surface of the guide-side cylindrical portion 243) does not come closer to the valve seat portion 26 in the axial direction beyond the passage axis "Co" of the vapor outlet passage 231.

The same advantages to the above advantages (A1), (A2) and (A3) of the first embodiment can be obtained in the second embodiment.

In addition, in the second embodiment, a length of the guide-side cylindrical portion 243 in the axial direction can be made smaller. Therefore, it becomes easier to make the weight of the guide member 240 smaller and the same advantage to the above advantage (A5) of the first embodiment can be also obtained.

Furthermore, the guide-side cylindrical portion 243 of the guide member 240 does not close or reduce the vapor outlet passage 231, even when the guide member 240 is rotated with respect to the valve housing 220. As a result, it becomes unnecessary to position the guide-side insertion portion 42 to the rod portion 61.

FURTHER EMBODIMENTS AND/OR MODIFICATIONS

The present disclosure can be modified in various manners without departing from a spirit of the present disclosure (for example, from the spirit of the first embodiment), as below.

Figure 14:
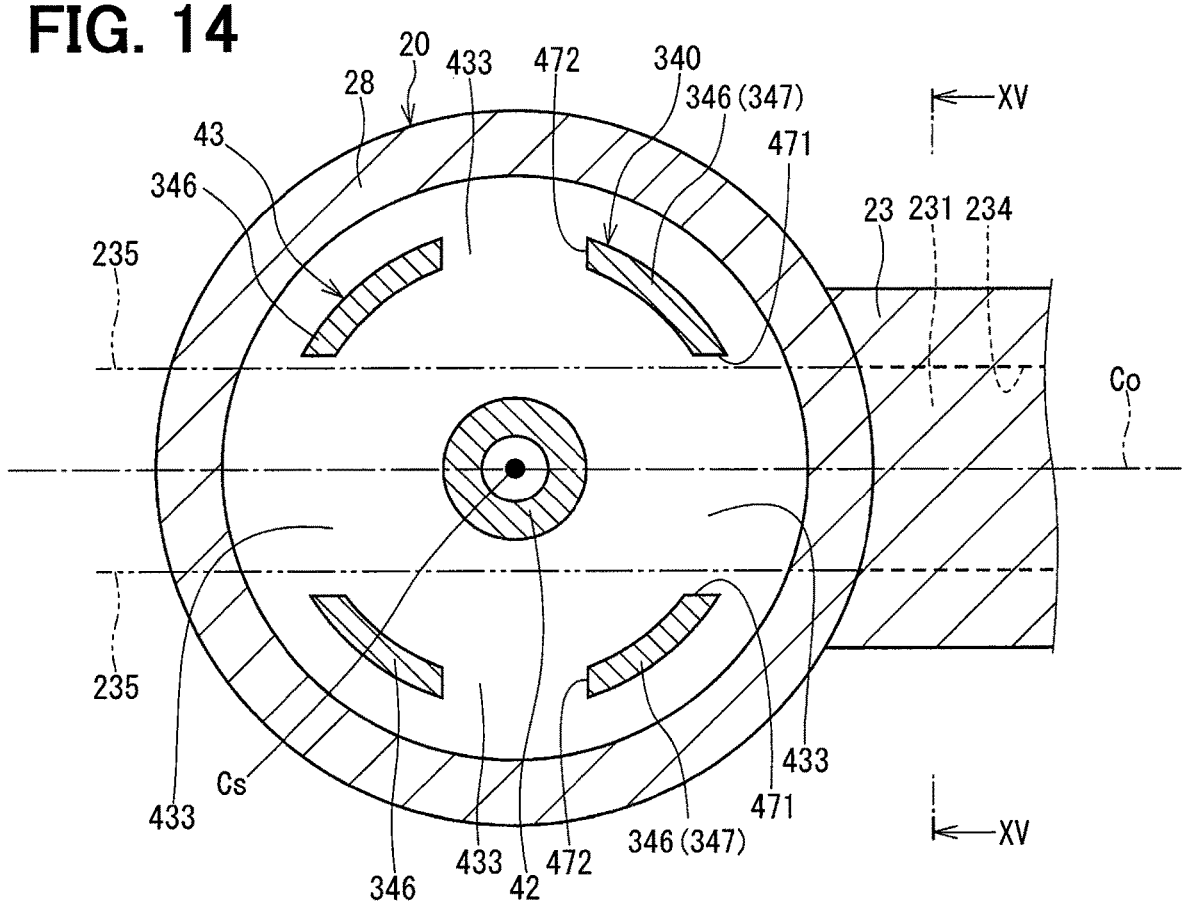
FIG. 14 is a schematic cross-sectional view showing the valve device of a first modification.

(M1) As shown in FIG. 14, more than three wall portions 346 may be provided in a guide member 340. Four wall portions 346 are symmetrically arranged with respect to the passage axis "Co" of the vapor outlet passage 231. Multiple (two) outlet-nearest wall portions 347 may be provided.

(M2) As shown in FIGS. 14 and 15, each of the outlet-nearest wall portions 347 of the guide member 340 (more exactly, the first and the second wall side ends 471 and 472) may be located at a position, which is outside of the virtual inner peripheral surface 235 in the radial direction of the vapor outlet pipe 23 and in the circumferential direction of the guide member 340. In the modification of FIG. 15, the overlapping area "Sd" is zero.

(M3) As shown in FIG. 16, each of outlet-nearest wall portions 447 may be located at such a position, at which an overlapping area is respectively formed between the outlet-pipe cross section 232 of the vapor outlet pipe 23 and each of the outlet-nearest wall portions 447, when viewed them in the axial direction of the vapor outlet pipe 23 and when the outlet-pipe cross section 232 is projected on the outlet-nearest wall portions 447. In FIG. 16, the overlapping area (a first overlapping area) formed between the outlet-pipe cross section 232 and the outlet-nearest wall portion 447 of the right-hand side is indicated by "Sd1", while the overlapping area (a second overlapping area) formed between the outlet-pipe cross section 232 and the outlet-nearest wall portion 447 of the left-hand side is indicated by "Sd2".

In the modification of FIG. 16, the valve housing 20 and a guide member 440 are so formed as to satisfy a relationship of the following formula 2. In other words, the valve housing 20 and the guide member 440 satisfy that a sum of the first overlapping area "Sd1" and the second overlapping area "Sd2" is smaller than the half of the outlet passage area "So". As above, multiple overlapping areas may be formed between the outlet-pipe cross section 232 and the outlet-nearest wall portions 447, when the outlet-pipe cross section 232 is projected on the outlet-nearest wall portions 447.

$$\text{``}Sd1\text{''}+\text{``}Sd2\text{''}\leq 0.5\times\text{``}So\text{''} \quad \text{(formula 2)}$$

The present disclosure can be further modified in various manners without departing from the spirit of the present disclosure (from the spirit of the second embodiment), as below.

Figure 17:
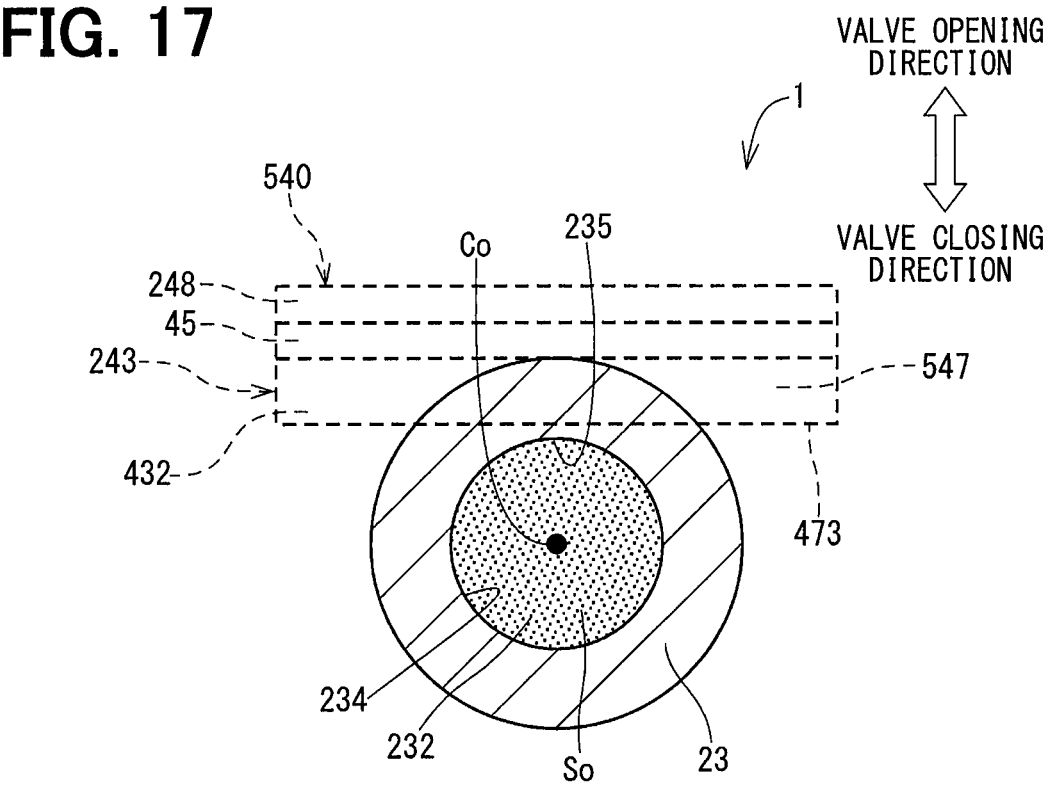
FIG. 17 is a schematic cross-sectional view showing the valve device of a fourth modification.

(M4) As shown in FIG. 17, the valve housing 220 and a guide member 540 may be so formed that the bottom-side wall surface 473 is located at a position outside of the virtual inner peripheral surface 235 in the radial direction of the vapor outlet pipe 23 (in the axial direction of the valve housing 20). In other words, the overlapping area "Sd" may be made to be zero.

In a similar manner to the above paragraph (M3), one or multiple overlapping areas may be formed between the outlet-pipe cross section 232 and an outlet-nearest wall portion 547, when viewed them in the axial direction of the vapor outlet pipe 23 and when the outlet-pipe cross section 232 is projected on the outlet-nearest wall portions 547.

The present disclosure can be furthermore modified in various manners without departing from the spirit of the present disclosure (from the spirits of the first and the second embodiments), as below.

Figure 18:
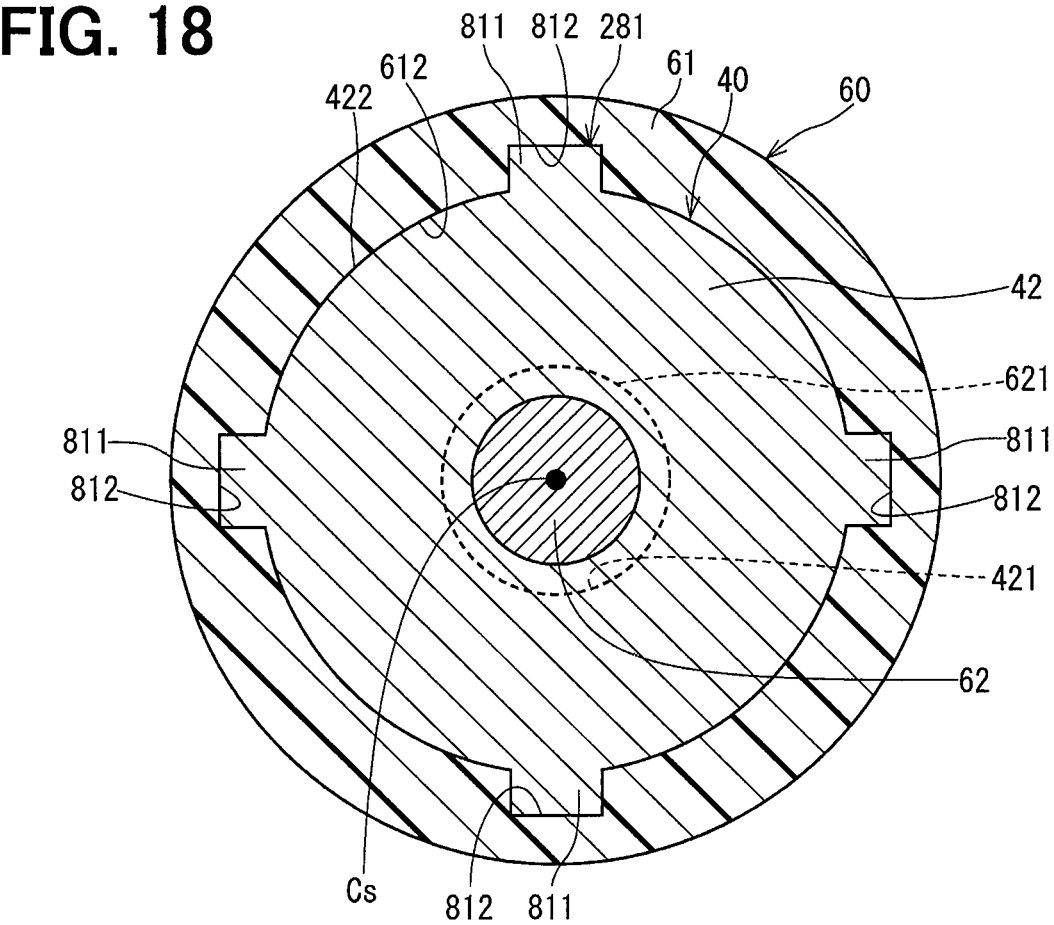
FIG. 18 is a schematic cross-sectional view showing the valve device of a fifth modification.

(M5) As shown in FIG. 18, multiple first rotation limiting portions 281 may be provided at the guide-side insertion portion 42 and the rod portion 61. Namely, multiple guide-side projecting portions 811 and multiple rod-side groove portions 812 may be respectively provided as the first rotation limiting portion 281.

Each of the guide-side projecting portions 811 is projected from the outer peripheral surface 422 of the guide-side insertion portion 42 in the radial-outward direction. The guide-side projecting portions 811 are arranged at equal intervals in the circumferential direction of the guide member 40. A number of the rod-side groove portions 812 is made to be equal to that of the guide-side projecting portions 811. In addition, a cross-sectional shape (for example, a rectangular shape) of the rod-side groove portion 812 on a plane perpendicular to the axial direction of the guide member 40 is made to be almost equal to that of the guide-side projecting portion 811.

The cross-sectional shape of the guide-side projecting portion 811 and the cross-sectional shape of the rod-side groove portion 812 may not be limited to the rectangular shape but can be modified to any other shape formed by curved lines.

Figure 19:
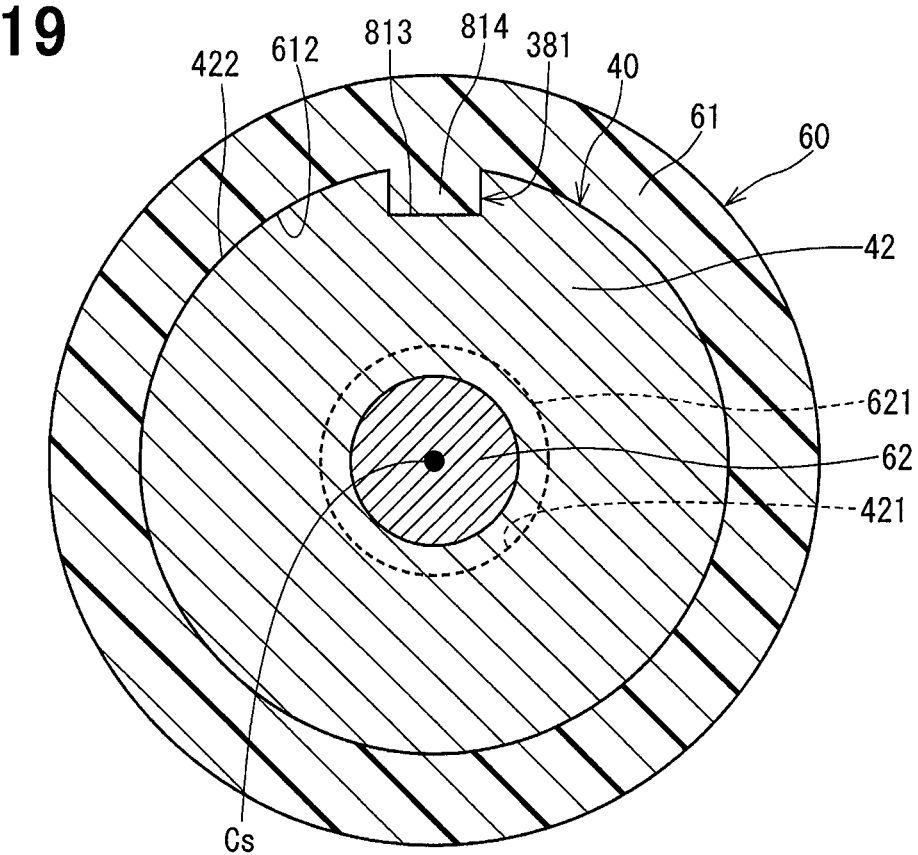
FIG. 19 is a schematic cross-sectional view showing the valve device of a sixth modification.

(M6) As shown in FIG. 19, a first rotation limiting portion 381 may be formed in the guide-side insertion portion 42 and the rod portion 61, wherein the first rotation limiting portion 381 is composed of a guide-side groove portion 813 and a rod-side projecting portion 814. In a similar manner to the above paragraph (M5), the first rotation limiting portion 381 may be composed of multiple guide-side groove portions 813 and multiple rod-side projecting portions 814.

Each of the guide-side groove portions 813 is recessed from the outer peripheral surface 422 in the radial-inward direction of the guide member 40. Each of the rod-side projecting portions 814 is projected from the inner wall surface 612 in the radial-inward direction of the guide member 40. A cross-sectional shape (for example, a rectangular shape) of the rod-side projecting portion 814 on the plane perpendicular to the axial direction of the rod portion 61 is made to be almost equal to that of the guide-side groove portion 813. When the rod-side projecting portion 814 is engaged with the guide-side groove portion 813, the relative rotation of the guide member 40 to the valve housing is limited.

The cross-sectional shape of the guide-side groove portion 813 and the cross-sectional shape of the rod-side projecting portion 814 may not be limited to the rectangular shape but can be modified to any other shape formed by curved lines.

Figure 20:
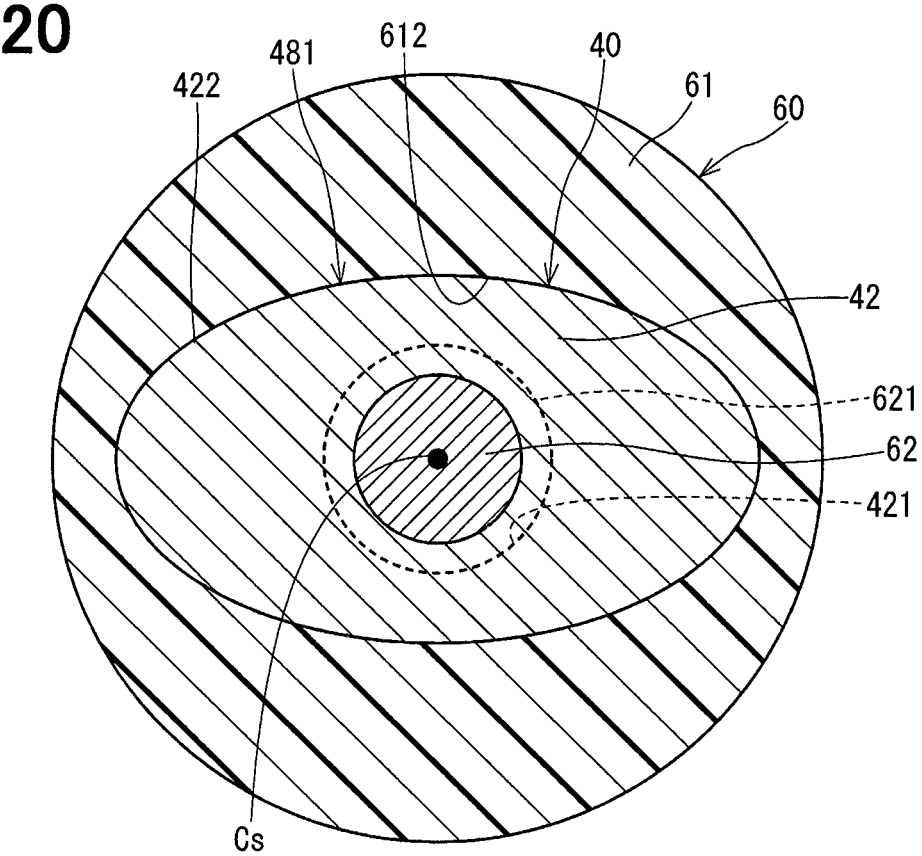
FIG. 20 is a schematic cross-sectional view showing the valve device of a seventh modification.

(M7) As shown in FIG. 20, a first rotation limiting portion 481 is formed in the guide-side insertion portion 42 and the rod portion 61. A cross-sectional shape of the outer peripheral surface 422 on a plane perpendicular to the axial direction of the guide member 40 is formed in an elliptical shape. In a similar manner, a cross-sectional shape of the inner wall surface 612 of the rod portion 61 on the plane perpendicular to the axial direction of the guide member 40 is formed in the elliptical shape, correspondingly to the elliptical shape of the outer peripheral surface 422.

The cross-sectional shape of the outer peripheral surface 422 of the guide-side insertion portion 42 and the cross-sectional shape of the inner wall surface 612 of the rod portion 61 may not be limited to the elliptical shape but can be modified to any other shape, such as, a polygonal shape, an elongated circular shape, an oval shape and so on.

Figure 21:
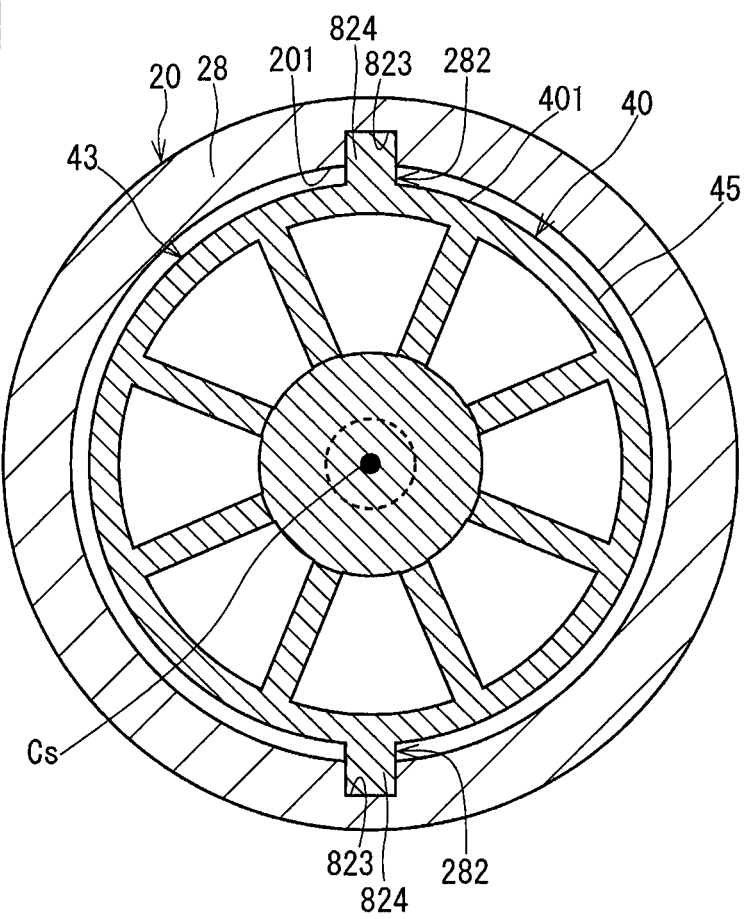
FIG. 21 is a schematic cross-sectional view showing the valve device of an eighth modification.

(M8) As shown in FIG. 21, a second rotation limiting portion 282 may be formed in the valve housing 20 and the guide member 40 in such a manner that the second rotation limiting portion 282 is composed of multiple housing-side groove portions 823 and multiple guide-side projecting portions 824.

Each of the housing-side groove portions 823 is recessed from the inner wall surface 201 of the valve housing 20 in the radial-outward direction of the valve housing 20. Each of the guide-side projecting portions 824 is projected from the outer wall surface 401 of the guide member 40 in the radial-outward direction of the guide member 40. When the guide-side projecting portions 824 are respectively engaged with the housing-side groove portions 823, the relative rotation of the guide member 40 to the valve housing 20 is limited.

The cross-sectional shape of each housing-side groove portion 823 and the cross-sectional shape of each guide-side projecting portion 824 on the plane perpendicular to the axial direction of the guide member 40 may not be limited to a rectangular shape but can be modified to any other shape formed by curved lines.

Figure 22:
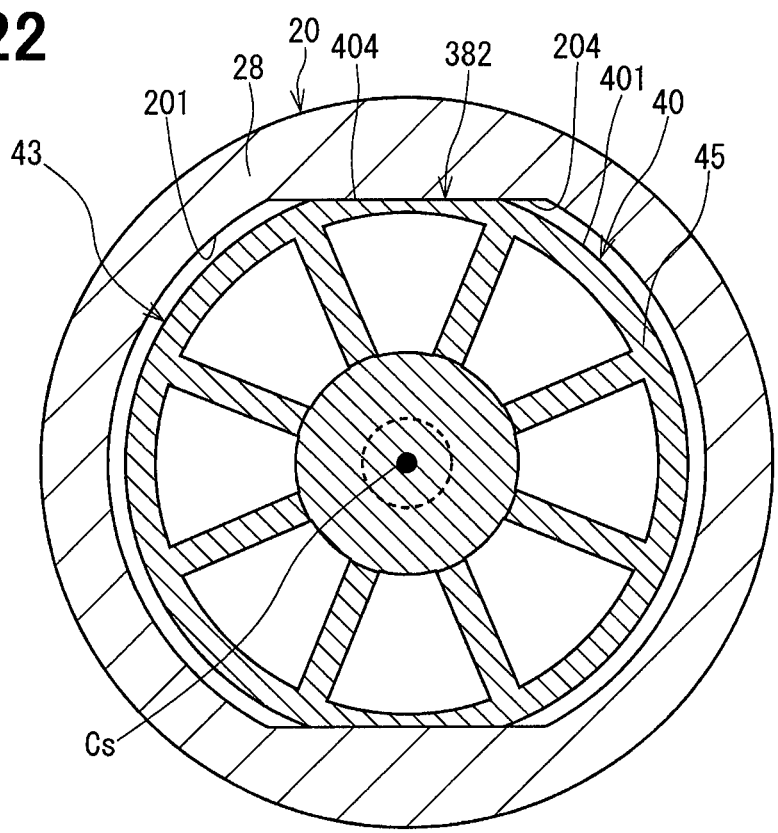
FIG. 22 is a schematic cross-sectional view showing the valve device of a ninth modification.

(M9) As shown in FIG. 22, a second rotation limiting portion 382 may be formed in the valve housing 20 and the guide member 40 in such a manner that a cross-sectional shape of the inner wall surface 201 of the valve housing 20 on the plane perpendicular to the axial direction of the guide member 40 is formed in an elongated circular shape and a cross-sectional shape of the outer wall surface 401 of the guide member 40 on the plane perpendicular to the axial direction of the guide member 40 is correspondingly formed in the elongated circular shape.

The inner wall surface 201 of the valve housing 20 has a pair of housing-side flat-surface portions 204. In a similar manner, the outer wall surface 401 of the guide member 40 has a pair of guide-side flat-surface portions 404. Each of the guide-side flat-surface portions 404 is opposed to each of the housing-side flat-surface portions 204 in the radial direction of the guide member 40. Each of the guide-side flat-surface portions 404 and each of the housing-side flat-surface portions 204 are in contact with each other. When the guide-side flat-surface portions 404 are engaged with the housing-side flat-surface portions 204, the relative rotation of the guide member 40 to the valve housing 20 is limited.

The cross-sectional shape of the inner wall surface 201 and the cross-sectional shape of the outer wall surface 401 are not limited to the elongated circular shape but can be modified to any other shape, such as, the polygonal shape, the elliptical shape, the oval shape and so on.

(M10) The outlet-pipe cross section 232 is not limited to the circular shape but can be modified to any other shape, such as, the polygonal shape, the elliptical shape, the elongated circular shape, the oval shape and so on.

The present disclosure is not limited to the above embodiments and/or modifications but can be further modified in various manners without departing from the spirit of the present disclosure.

What is claimed is:

1. A valve device comprising;
   a valve housing formed in a cylindrical shape and having;
   (1a) a vapor inlet passage through which fluid flows into an inside of the valve housing;
   (1b) a vapor outlet pipe including a vapor outlet passage, which extends in a radial direction perpendicular to an axial direction of the vapor inlet passage and through which the fluid from the vapor inlet passage flows to an outside of the valve housing;
   (1c) a valve inside passage formed in the inside of the valve housing and operatively communicated to each of the vapor inlet passage and the vapor outlet passage;
   (1d) a valve seat portion formed in an inner wall of a housing bottom portion, which is formed on an axial side of valve housing connected to the vapor inlet passage;
   a valve member movably accommodated in the valve housing for blocking off fluid flow through the valve inside passage when the valve member is brought into contact with the valve seat portion, the fluid being allowed to flow from the vapor inlet passage to the vapor outlet passage through the valve inside passage when the valve member is separated from the valve seat portion in the axial direction;
   a guide member movably accommodated in the valve housing, the guide member being operatively movable with the valve member, and the guide member having an outlet-nearest wall portion which is located at a position closer to the vapor outlet pipe and extends in a circumferential direction of the guide member and in a radial direction of the vapor outlet pipe, which is perpendicular to an axial direction of the vapor outlet pipe; and
   a valve control unit for controlling an axial movement of the guide member,
   wherein the valve housing and the guide member are so formed that an overlapping area is smaller than a half of an outlet passage area of the vapor outlet passage,
   wherein the overlapping area is defined as an area in which an outlet-passage cross section overlaps with the outlet-nearest wall portion when viewed them in the axial direction of the vapor outlet pipe and when the outlet-passage cross section is projected on the outlet-nearest wall portion,
   wherein the outlet-passage cross section is a cross section of the vapor outlet pipe on a plane perpendicular to the axial direction of the vapor outlet pipe,
   wherein the outlet passage area is a cross-sectional area of the vapor outlet passage on the plane perpendicular to the axial direction of the vapor outlet pipe.

2. The valve device according to claim 1,
   wherein the outlet-nearest wall portion has;
      a bottom-side wall surface being opposed to the valve seat portion in an axial direction of the guide member;
      a first wall side end extending from the bottom-side wall surface in the axial direction of the guide member and located at a first position closer to the vapor outlet pipe in the circumferential direction of the guide member; and
      a second wall side end extending from the bottom-side wall surface in the axial direction of the guide member and located at a second position opposite to the first position in the circumferential direction of the guide member,
   wherein at least a part of the first wall side end is located at a position between a virtual inner peripheral surface and a virtual center surface in the circumferential direction of the guide member,
   wherein the second wall side end is located at a position outside of the virtual inner peripheral surface in the circumferential direction of the guide member and in the radial direction of the vapor outlet pipe, which is perpendicular to a passage axis of the vapor outlet passage,
   wherein a surface extending in the axial direction of the vapor outlet pipe from an inner peripheral surface of the vapor outlet pipe is defined as the virtual inner peripheral surface, and
   wherein a surface passing over the passage axis of the vapor outlet passage is defined as the virtual center surface.

3. The valve device according to claim 1,
   wherein the outlet-nearest wall portion has;
      a bottom-side wall surface being opposed to the valve seat portion in an axial direction of the guide member;
      a first wall side end extending from the bottom-side wall surface in the axial direction of the guide member and located at a first position closer to the vapor outlet pipe in the circumferential direction of the guide member; and
      a second wall side end extending from the bottom-side wall surface in the axial direction of the guide member and located at a second position opposite to the first position in the circumferential direction of the guide member,
   wherein each of the first and the second wall side ends is located at a position outside of a virtual inner peripheral surface in the circumferential direction of the guide member and in the radial direction of the vapor outlet pipe, which is perpendicular to a passage axis of the vapor outlet passage, and
   wherein a surface extending in the axial direction of the vapor outlet pipe from an inner peripheral surface of the vapor outlet pipe is defined as the virtual inner peripheral surface.

4. The valve device according to claim 2,
   wherein the guide member has multiple cut-out portions arranged at equal intervals in the circumferential direction of the guide member.

5. The valve device according to claim 1, wherein
   the outlet-nearest wall portion has a bottom-side wall surface being opposed to the valve seat portion in an axial direction of the guide member, and
   the bottom-side wall surface is located at a position on a side of a passage axis of the vapor outlet passage, which is away from the valve seat portion in the axial direction of the guide member.

6. The valve device according to claim 5, wherein the outlet-nearest wall portion is formed in an annular shape on a plane perpendicular to the axial direction of the guide member.

7. The valve device according to claim 1, further comprising;
a rotation limiting portion for limiting a rotation of the guide member relative to the valve housing in the circumferential direction of the guide member.

8. The valve device according to claim 7, wherein
the guide member has a guide-side insertion portion formed in a cylindrical shape having a closed axial end, the guide-side insertion portion being formed in the guide member on a side opposite to the valve seat portion in the axial direction of the guide member,
the valve control unit is formed in a cylindrical shape and has a rod portion, into which the guide-side insertion portion is movably inserted, and
the rotation limiting portion is formed in the guide-side insertion portion and the rod portion.

9. The valve device according to claim 7, wherein
the valve housing has an inner wall surface at a position neighboring to the valve seat portion,
the guide member has an outer wall surface opposing to the inner wall surface of the valve housing, and
the rotation limiting portion is formed in the inner wall surface of the valve housing and the outer wall surface of the guide member.

10. A valve device comprising;
a valve housing formed in a cylindrical shape and having;
(1a) a vapor inlet passage through which fluid flows into an inside of the valve housing;
(1b) a vapor outlet pipe including a vapor outlet passage, which extends in a radial direction perpendicular to an axial direction of the vapor inlet passage and through which the fluid from the vapor inlet passage flows to an outside of the valve housing;
(1c) a valve inside passage formed in the inside of the valve housing and operatively communicated to each of the vapor inlet passage and the vapor outlet passage;
(1d) a valve seat portion formed in an inner wall of a housing bottom portion, which is formed on an axial side of valve housing connected to the vapor inlet passage;
(1e) a cylindrical inner wall surface formed at a position neighboring to the valve seat portion;
a valve member movably accommodated in the valve housing for blocking off fluid flow through the valve inside passage when the valve member is brought into contact with the valve seat portion, the fluid being allowed to flow from the vapor inlet passage to the vapor outlet passage through the valve inside passage when the valve member is separated from the valve seat portion in the axial direction;
a guide member movably accommodated in the valve housing, the guide member being operatively movable with the valve member, and the guide member having an outlet-nearest wall portion which is located at a position closer to the vapor outlet pipe and extends in a circumferential direction of the guide member and in a radial direction of the vapor outlet pipe, which is perpendicular to an axial direction of the vapor outlet pipe, the guide member having multiple cut-out portions arranged at equal intervals in the circumferential direction of the guide member, and the guide member having a cylindrical outer wall surface opposing to the cylindrical inner wall surface of the valve housing; and
a valve control unit for controlling an axial movement of the guide member,
wherein the valve housing and the guide member are so formed that an overlapping area is smaller than a half of an outlet passage area of the vapor outlet passage,
wherein the overlapping area is defined as an area in which an outlet-passage cross section overlaps with the outlet-nearest wall portion when viewed them in the axial direction of the vapor outlet pipe and when the outlet-passage cross section is projected on the outlet-nearest wall portion,
wherein the outlet-passage cross section is a cross section of the vapor outlet pipe on a plane perpendicular to the axial direction of the vapor outlet pipe,
wherein the outlet passage area is a cross-sectional area of the vapor outlet passage on the plane perpendicular to the axial direction of the vapor outlet pipe,
wherein the valve device further comprises a rotation limiting portion for limiting a rotation of the guide member relative to the valve housing in the circumferential direction of the guide member,
wherein the guide member has a guide-side insertion portion formed in a cylindrical shape having a closed axial end, the guide-side insertion portion being formed in the guide member on a side opposite to the valve seat portion in the axial direction of the guide member,
wherein the valve control unit is formed in a cylindrical shape and has a rod portion, into which the guide-side insertion portion is movably inserted,
wherein the rotation limiting portion includes a first limiting portion formed in the guide-side insertion portion and the rod portion,
wherein the rotation limiting portion includes a second limiting portion formed in the inner wall surface of the valve housing and the outer wall surface of the guide member.

* * * * *